(12) United States Patent
Iwata et al.

(10) Patent No.: US 10,252,302 B2
(45) Date of Patent: Apr. 9, 2019

(54) HYDROPHILIC LAMINATE AND METHOD FOR MANUFACTURING THE SAME, ANTIFOULING LAMINATE, PRODUCT AND METHOD FOR MANUFACTURING THE SAME, AND ANTIFOULING METHOD

(71) Applicant: DEXERIALS CORPORATION, Tokyo (JP)

(72) Inventors: Ryosuke Iwata, Tochigi (JP); Mikihisa Mizuno, Tochigi (JP); Shinobu Hara, Tochigi (JP)

(73) Assignee: DEXERIALS CORPORATION, Tokyo (JP)

( * ) Notice: Subject to any disclaimer, the term of this patent is extended or adjusted under 35 U.S.C. 154(b) by 581 days.

(21) Appl. No.: 14/160,801

(22) Filed: Jan. 22, 2014

(65) Prior Publication Data

US 2014/0205801 A1 Jul. 24, 2014

(30) Foreign Application Priority Data

Jan. 23, 2013 (JP) ................................ 2013-009767
Jan. 15, 2014 (JP) ................................ 2014-005020

(51) Int. Cl.
*B32B 3/30* (2006.01)
*B08B 17/06* (2006.01)
(Continued)

(52) U.S. Cl.
CPC .......... *B08B 17/06* (2013.01); *B29C 37/0032* (2013.01); *B29C 59/022* (2013.01); *B29C 59/046* (2013.01); *B29C 59/16* (2013.01); *B32B 3/30* (2013.01); *C08F 122/105* (2013.01); *C08F 222/1006* (2013.01); *B29C 2035/085* (2013.01);
(Continued)

(58) Field of Classification Search
None
See application file for complete search history.

(56) References Cited

U.S. PATENT DOCUMENTS

2006/0286383 A1* 12/2006 Gilmer .............. C08F 222/1006
428/412
2008/0182044 A1* 7/2008 Itami .................... B01D 69/125
428/32.26

(Continued)

FOREIGN PATENT DOCUMENTS

JP 7-42365 Y 10/1995
JP 11-217560 A 8/1999
(Continued)

OTHER PUBLICATIONS

CAS Registry on compound 2399-48-6, retrieved using Sci-Finder on Aug. 10, 2017.*
(Continued)

*Primary Examiner* — Z. Jim Yang
(74) *Attorney, Agent, or Firm* — Pergament & Cepeda LLP; Milagros A. Cepeda; Edward D. Pergament

(57) ABSTRACT

A hydrophilic laminate, including: a substrate made of a resin; and a hydrophilic resin layer on the substrate made of a resin, wherein the hydrophilic resin layer comprises micro convex portions or micro concave portions in a surface thereof, and wherein a pure water contact angle of the surface of the hydrophilic resin layer is less than 40°.

7 Claims, 22 Drawing Sheets

(51) Int. Cl.
*B29C 59/02* (2006.01)
*C08F 122/10* (2006.01)
*C08F 222/10* (2006.01)
*B29C 37/00* (2006.01)
*B29C 59/04* (2006.01)
*B29C 59/16* (2006.01)
*B29C 35/08* (2006.01)

(52) U.S. Cl.
CPC ......... *B29C 2035/0822* (2013.01); *B29C 2035/0827* (2013.01); *B29C 2035/0838* (2013.01); *B29C 2035/0844* (2013.01); *B29C 2035/0872* (2013.01); *B29C 2035/0877* (2013.01); *B29C 2037/0042* (2013.01); *B29C 2059/023* (2013.01); *B29K 2995/0092* (2013.01); *C08F 2222/108* (2013.01); *C08F 2222/1066* (2013.01); *Y10T 428/24355* (2015.01)

(56) References Cited

U.S. PATENT DOCUMENTS

| | | | | |
|---|---|---|---|---|
| 2010/0266794 | A1* | 10/2010 | Wright | A61L 15/60 428/35.7 |
| 2010/0323165 | A1* | 12/2010 | Sakuma | G02B 1/118 428/167 |
| 2011/0002041 | A1* | 1/2011 | Tazawa | G02B 1/118 359/609 |
| 2011/0128629 | A1* | 6/2011 | Takahashi | G02B 27/0006 359/601 |
| 2011/0318539 | A1* | 12/2011 | Ozawa | B29C 33/60 428/172 |
| 2012/0121858 | A1* | 5/2012 | Kato | B05D 5/08 428/141 |
| 2012/0127580 | A1* | 5/2012 | Okamoto | G02B 1/118 359/609 |
| 2012/0156431 | A1 | 6/2012 | Suto et al. | |
| 2013/0004718 | A1* | 1/2013 | Takihara | G02B 1/04 428/156 |
| 2013/0011611 | A1* | 1/2013 | Taguchi | C09J 7/38 428/142 |
| 2013/0075962 | A1* | 3/2013 | Jigami | B29C 33/62 264/496 |
| 2013/0088784 | A1* | 4/2013 | Kojima | B29C 33/424 359/601 |
| 2013/0302564 | A1* | 11/2013 | Takihara | C08F 290/046 428/141 |
| 2014/0065367 | A1* | 3/2014 | Matsumoto | G02B 1/04 428/141 |
| 2014/0077418 | A1* | 3/2014 | Otani | B29C 59/046 264/447 |
| 2014/0098422 | A1* | 4/2014 | Fukuda | B29D 11/00346 359/601 |
| 2014/0120313 | A1 | 5/2014 | Uchida et al. | |
| 2015/0226961 | A1* | 8/2015 | Minoura | E06B 7/12 359/507 |
| 2015/0231854 | A1* | 8/2015 | Nakai | B32B 3/30 428/172 |
| 2016/0054478 | A1* | 2/2016 | Otani | G02B 1/118 428/141 |

FOREIGN PATENT DOCUMENTS

| | | | | |
|---|---|---|---|---|
| JP | 2001-212966 A | 8/2001 | | |
| JP | 2002-201045 A | 7/2002 | | |
| JP | 2004-263008 A | 9/2004 | | |
| JP | 2005-299734 A | 10/2005 | | |
| JP | 2006-044195 A | 2/2006 | | |
| JP | 2007-187868 A | 7/2007 | | |
| JP | 2007187868 A | * | 7/2007 | |
| JP | 2007-237457 A | 9/2007 | | |
| JP | 3153279 U | 9/2009 | | |
| JP | 2009-269237 A | 11/2009 | | |
| JP | 2010-120377 A | 6/2010 | | |
| JP | 2011-053334 A | 3/2011 | | |
| JP | 4689718 B2 | 5/2011 | | |
| JP | WO 2011115162 A1 | * | 9/2011 | ........ G02B 1/04 |
| JP | WO 2011118367 A1 | * | 9/2011 | ........ C09J 7/0207 |
| JP | 2012-159598 A | 8/2012 | | |
| JP | 5045857 B1 | 10/2012 | | |
| JP | WO 2012157717 A1 | * | 11/2012 | ........ G02B 1/04 |
| JP | 2013001007 A | * | 1/2013 | |
| JP | 2013018910 A | * | 1/2013 | |
| JP | 5356612 B2 | 12/2013 | | |
| WO | 2008/096872 A1 | 8/2008 | | |
| WO | WO-2012096322 A1 | * | 7/2012 | ........ C08F 290/046 |
| WO | 2012/176906 A1 | 12/2012 | | |

OTHER PUBLICATIONS

Machine translation of JP 2013/001007 A, obtained from Espacenet.*
Office Action mailed by the Patent Office of Japan dated Jun. 10, 2014, for corresponding Patent Application No. 2014-005020.
Office Action mailed by the Patent Office of Japan dated Jun. 10, 2014, for corresponding Patent Application No. 2014-005020. (English Translation).

* cited by examiner

HYDROPHILIC LAMINATE AND METHOD FOR MANUFACTURING THE SAME, ANTIFOULING LAMINATE, PRODUCT AND METHOD FOR MANUFACTURING THE SAME, AND ANTIFOULING METHOD

This application claims priority to Japanese provisional application Nos. 2013-009767 filed on Jan. 23, 2013; and 2014-005020 filed on Jan. 15, 2014, all of which are hereby incorporated by reference in their entireties.

FIELD OF THE INVENTION

The present invention relates to a hydrophilic laminate, which has a hydrophilicity, can be used in a wide variety of fields including building use, industrial use, automobile use, optical use and solar battery panels, and can be manufactured in a simple molding process and a method for manufacturing the hydrophilic laminate, an antifouling laminate using the hydrophilic laminate, a product using the hydrophilic laminate and a method for manufacturing the product, and an antifouling method using the hydrophilic laminate.

BACKGROUND

To decorate and protect the surfaces of products, resin films and glass and the like are attached to the surfaces.

However, the resin films and glass decorating and protecting the surfaces of products sometimes get cloudy and dirty to reduce visibility and good appearance of the products.

To prevent reduction of visibility and good appearance of products, a hydrophilization treatment is applied to the resin films and glass.

As a technique of the hydrophilization treatment, for example, preventing formation of fine water drops by applying an anticlouding agent containing a surfactant, etc., to the surface of an object, thereby improving wettability of the coating surface with water has been proposed (see, for example, Japanese Patent Application Laid-Open (JP-A) No. 2004-263008). However, the technique proposed herein has a problem. Although the surface can be easily converted to be hydrophilic, the hydrophilic effect does not last long because of spray coating.

As another technique, using photocatalytic activity of $TiO_2$ by placing a $TiO_2$ layer having a photocatalytic function on a surface of a glass substrate, is proposed (see, for example, JP-A No. 2002-201045). However, the technique proposed therein has a problem. Since a sufficient amount of ultraviolet rays is required to express a photocatalytic function, $TiO_2$ is applicable to limited sites.

As a technique for improving hydrophilicity of a transparent substrate surface, uniformly forming a micro concavoconvex surface due to an inorganic powder added to the film, on a substrate, thereby making the film to be hydrophilic is proposed (see, for example, JP-A No. 11-217560). However, the technique proposed herein has a problem. In the technique, a dispersion solution containing a silicon dioxide fine powder is applied to soda glass, heated and cured at 120° C. for 30 minutes. Thus, a substrate material is limited.

Another technique is proposed in which convexoconcave portions are formed in a silicon plate or glass by photolithography and etching and oxidized to render the surface of convexoconcave portions to be hydrophilic, as a structure for maintaining hydrophilicity for a long term (see, for example, JP-A No. 2001-212966). However, the technique proposed herein has a problem in that this technique cannot be applied to a substrate made of a resin.

Another technique for maintaining hydrophilicity by forming a micro structure in a nano-meter size is proposed (see, for example, JP-A No. 2007-187868). However, in the technique proposed herein, disclosure of hydrophilicity is limited to the cases where a substrate is made of glass such as automobile front windows and side windows and no disclosure is made of the case where a substrate is made of a resin such as an acrylic resin.

In the circumstances, it is presently desired to provide a hydrophilic laminate capable of maintaining hydrophilicity for a long term without limitation of applicable sites even if an easily processed substrate made of a resin is used, and a method for manufacturing such a hydrophilic laminate, an antifouling laminate using the hydrophilic laminate, a product using the hydrophilic laminate, and a method for manufacturing the product, and an antifouling method using the hydrophilic laminate.

SUMMARY OF THE INVENTION

An object of the present invention is to solve the aforementioned problems in the art and attain the following object. More specifically, an object of the present invention is to provide a hydrophilic laminate capable of maintaining a hydrophilicity for a long term without limitation of applicable sites even if an easily processed substrate made of a resin is used, and a method for manufacturing the hydrophilic laminate, an antifouling laminate using the hydrophilic laminate, a product using the hydrophilic laminate and a method for manufacturing the product and an antifouling method using the hydrophilic laminate.

The means for solving the aforementioned problems are as follows.

In one aspect, the present invention provides a hydrophilic laminate, including:
    a substrate made of a resin; and
    a hydrophilic resin layer on the substrate made of a resin,
    wherein the hydrophilic resin layer includes micro convex portions or micro concave portions in a surface thereof, and
    wherein a pure water contact angle of the surface of the hydrophilic resin layer is less than 40°.

In one variant, the present invention provides the hydrophilic laminate according to the present invention wherein the hydrophilic laminate has an elongation percentage of 10% or more.

In one variant, the present invention provides the hydrophilic laminate according to the present invention, wherein a Martens hardness of the hydrophilic resin layer is 50 $N/mm^2$ to 300 $N/mm^2$.

In one variant, the present invention provides the hydrophilic laminate according to any one of the present invention, wherein the hydrophilic resin layer contains a cured product of an active energy ray curable resin composition containing a polyethylene glycol (meth)acrylate.

In another aspect, the present invention provides an antifouling laminate, including:
    the hydrophilic laminate according to the present invention.

In another aspect, the present invention provides a method for manufacturing the hydrophilic laminate according to the present invention, the method including:
    forming an uncured resin layer by applying an active energy ray curable resin composition to a substrate made of a resin; and forming a hydrophilic resin layer by bringing a transfer matrix having micro convex portions or micro concave portions into contact with the uncured resin layer, irradiating an active energy ray to the uncured resin layer in contact with the transfer matrix with an active energy ray to cure the uncured resin layer, thereby transferring the micro convex portions or the micro concave portions.

In one variant, the present invention provides the method for manufacturing the hydrophilic laminate according to the present invention, wherein the micro convex portions or the micro concave portions of the transfer matrix are formed by etching a surface of the transfer matrix with a photoresist having a predetermined pattern shape used as a protection film.

In one variant, the present invention provides the method for manufacturing the hydrophilic laminate according to the present invention, wherein the micro convex portions or the micro concave portions of the transfer matrix are formed by laser processing of a surface of the transfer matrix by irradiating the surface of the transfer matrix with a laser beam.

In another aspect, the present invention provides a product, including:

the hydrophilic laminate according to the present invention on a surface thereof.

In another aspect, the present invention provides a method for manufacturing the product according to the present invention, the method including:

heating a hydrophilic laminate;

molding the hydrophilic laminate heated into a desired shape; and injecting a molding material to the hydrophilic laminate molded in the desired shape at a side of the substrate made of a resin and molding the molding material.

In one variant, the present invention provides the method for manufacturing the product according to the present invention, wherein the heating is performed by infrared heating.

In another aspect, the present invention provides an antifouling method for protecting a product from getting dirty, the method including:

laminating the hydrophilic laminate according to the present invention on a surface of the product.

According to the present invention, the problems in the art are overcome and the objects of the present invention can be attained, and it is possible to provide a hydrophilic laminate capable of maintaining a hydrophilicity for a long term without limitation of applicable sites even if an easily processed substrate made of a resin is used and a method for manufacturing the hydrophilic laminate, an antifouling laminate using the hydrophilic laminate, a product using the hydrophilic laminate and a method for manufacturing the product, and an antifouling method using the hydrophilic laminate.

Figure 1A:
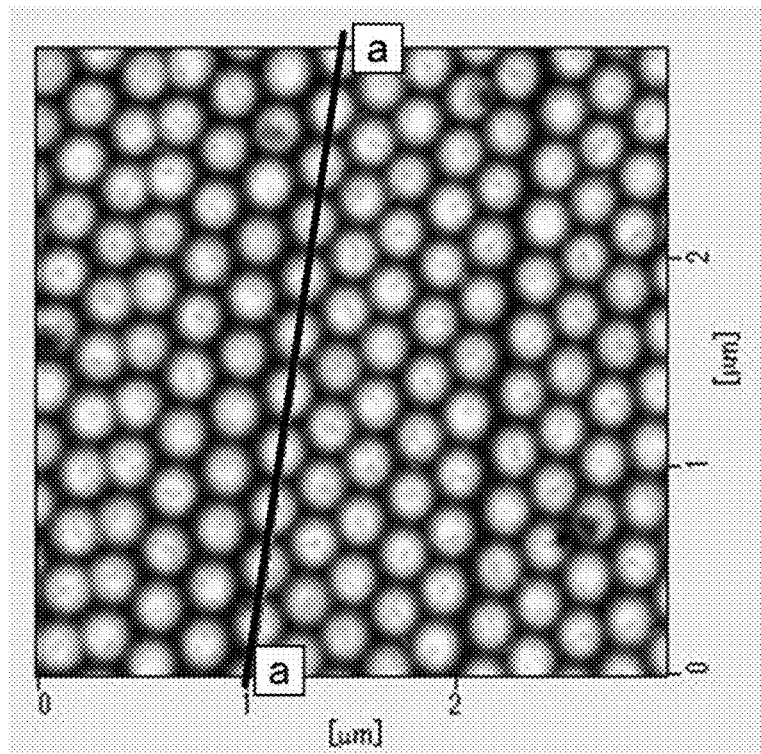
FIG. 1A is an atomic force microscope (AFM) image showing an example of a surface of a hydrophilic resin layer having convex portions.

DETAILED DESCRIPTION OF THE INVENTION (Hydrophilic Laminate)

The hydrophilic laminate of the present invention contains at least: a substrate made of a resin, and a hydrophilic resin layer; and further contains other members as necessary.

<Substrate Made of a Resin>

The material for the substrate made of a resin is not particularly limited and can be appropriately selected depending upon the purpose. Examples of the material include triacetylcellulose (TAC), polyester (TPEE), polyethylene terephthalate (PET), polyethylenenaphthalate (PEN), polyimide (PI), polyamide (PA), aramid, polyethylene (PE), polyacrylate, polyethersulfone, polysulfone, polypropylene (PP), polystyrene, diacetylcellulose, poly(vinyl chloride), an acrylic resin (PMMA), polycarbonate (PC), an epoxy resin, a urea resin, a urethane resin, a melamine resin, a phenolic resin, an acrylonitrile-butadiene-styrene copolymer, a cycloolefin polymer (COP), a cycloolefin copolymer (COC), a PC/PMMA laminate, and a rubber-added PMMA.

The substrate made of a resin preferably has transparency.

The form of the substrate made of a resin, which is not particularly limited and can be appropriately selected depending upon the purpose, is preferably a film form.

If the substrate made of a resin is a film, the average thickness of the substrate made of a resin, which is not particularly limited and can be appropriately selected depending upon the purpose, is preferably 5 µm to 1,000 µm and more preferably 50 µm to 500 µm.

On the surface of the substrate made of a resin, letters, patterns and images, etc. may be printed.

On the surface of the substrate made of a resin, a binder layer may be provided in order to increase adhesion between the substrate made of a resin and a molding material in forming the hydrophilic laminate in a molding process or in order to protect the letters, patterns and images from flow resistive pressure of the molding material during a molding process. As the material for the binder layer, binders made of acryl, urethane, polyester, polyamide, ethylenebutyl alcohol and an ethylene-vinyl acetate copolymer; and adhesives can be used. Note that the binder layer may be formed of two layers or more. As the binder to be used, a binder having heat-sensitivity and pressure-sensitivity suitable for a molding material can be selected.

<Hydrophilic Resin Layer>

The hydrophilic resin layer has micro convex portions or micro concave portions in the surface.

The pure water contact angle of the surface of the hydrophilic resin layer is less than 40°.

The hydrophilic resin layer is formed on the substrate made of a resin.

The hydrophilic resin layer, which is not particularly limited and can be appropriately selected depending upon the purpose, preferably contains a cured product of an active energy ray curable resin composition.

—Micro Convex Portion and Micro Concave Portion—

The hydrophilic resin layer contains micro convex portions or micro concave portions in a surface thereof.

The micro convex portions or micro concave portions are formed in the surface of the hydrophilic resin layer, which is an opposite surface to the surface facing the substrate made of a resin.

The micro convex portions herein refer to those formed on the surface of the hydrophilic resin layer and arranged at an average interval (distance) of 1,000 nm or less.

The micro concave portions herein refer to those formed in the surface of the hydrophilic resin layer and arranged at an average interval (distance) of 1,000 nm or less.

The shapes of the convex portions and the concave portions are not particularly limited and can be appropriately selected depending upon the purpose. Examples of the shapes include cone-shaped, columnar, needle, a partially spherical shape (for example, semispherical shape), a partially ellipsoidal shape (for example, semi-ellipsoidal shape) and a polygonal shape. It is not necessary that these shapes are those completely satisfying mathematical definitions and may have distortion to some extent.

The convex portions or the concave portions are two-dimensionally arranged in the surface of the hydrophilic resin layer. The convex portions or the concave portions may be regularly or randomly arranged. In the case of regular arrangement, the convex portions or the concave portions are most densely arranged.

The average distance between adjacent convex portions, which is not particularly limited and can be appropriately selected depending upon the purpose, is preferably 5 nm to 1,000 nm, more preferably 10 nm to 500 nm, and particularly preferably 50 nm to 300 nm.

The average distance between adjacent concave portions, which is not particularly limited and can be appropriately selected depending upon the purpose, is preferably 5 nm to 1,000 nm, more preferably 10 nm to 500 nm, and particularly preferably 50 nm to 300 nm.

If each of the average distances between adjacent convex portions and the average distance between adjacent concave portions falls within the preferable range, a hydrophilic component deposited onto the hydrophilic resin layer effectively spreads in wet condition. If each of the average distances falls within the particularly preferable range, a hydrophilic component significantly effectively spreads in wet condition.

The average height of the convex portions, which is not particularly limited and can be appropriately selected depending upon the purpose, is preferably 1 nm to 1,000 nm, more preferably 5 nm to 500 nm, further preferably 10 nm to 300 nm, and particularly preferably 50 nm to 300 nm.

The average depth of the concave portions, which is not particularly limited and can be appropriately selected depending upon the purpose, is preferably 1 nm to 1,000 nm, more preferably 5 nm to 500 nm, further preferably 10 nm to 300 nm, and particularly preferably 50 nm to 300 nm.

If each of the average height of the convex portions and the average depth of the concave portions falls within the preferable range, a hydrophilic component deposited onto the hydrophilic resin layer effectively spreads in wet condition. If each of the average height and the average depth falls within the particularly preferable range, a hydrophilic component significantly effectively spreads in wet condition.

The average aspect ratio (the average height of the convex portions/the average distance between adjacent convex portions) of the convex portions and the average aspect ratio (the average depth of the concave portions/the average distance of adjacent concave portions) of the concave portions, which are not particularly limited and can be appropriately selected depending upon the purpose, are each preferably 0.001 to 1,000, more preferably 0.1 to 10, and particularly preferably 0.2 to 1.0.

If each of the average aspect ratio of the convex portions and the average aspect ratio of the concave portions falls within the preferable range, a hydrophilic component deposited onto the hydrophilic resin layer effectively spreads in wet condition. If each of the aspect ratios falls within the particularly preferable range, a hydrophilic component significantly effectively spreads in wet condition.

The average distance (Pm) of convex portions or concave portions herein and the average height of convex portions or average depth (Hm) of concave portions can be determined as follows.

First, the surface S of the hydrophilic resin layer having convex portions or concave portions is observed by an atomic force microscope (AFM). From a section profile by the AFM, the pitch of convex portions or concave portions, and the height of the convex portion or the depth of the concave portion are obtained. This procedure is repeated with respect to 10 sites randomly selected from the surface of the hydrophilic resin layer to obtain pitch P1, P2, . . . , P10 and the height or depth H1, H2, . . . , H10.

The pitch of the convex portions herein is the distance between the peaks of convex portions. The pitch of the concave portions is the distance between the deepest points of concave portions. The height of the convex portion is the height of the convex portion based on the lowest point of the valley portion between the convex portions. The depth of the concave portion is the depth of the concave portion based on the highest point of the mount portion between the concave portions.

Then, these pitches P1, P2, . . . , P10, and height or depth H1, H2, . . . , H10 are simply averaged (arithmetic average), respectively to obtain the average distance (Pm) of convex portions or concave portions, average height of convex portions or the average depth (Hm) of the concave portions.

Note that if the pitch of the convex portion or concave portion has in-plane anisotropy, the pitch in the direction giving a maximum value is used to obtain Pm. If the height of the convex portion or the depth of the concave portion has in-plane anisotropy, the height or depth in the direction giving a maximum value is used to obtain Hm.

If the convex portions or concave portions have rod shapes, the pitch in the minor axis direction is used as the pitch.

Note that in the AFM observation, in order for the convex peak or the bottom edge of the concave in a section profile to match the convex peak or the deepest portion of the concave portion of a three dimensional shape, the section profile is cut out in such a way that a cut line passes through the convex peak of the three dimensional shape to be measured or the deepest portion of the concave portion of the three dimensional shape.

Whether the micro structures formed in the surface of the hydrophilic resin layer are convex portions or concave portions is determined as follows.

The surface S of the hydrophilic resin layer having convex portions or concave portions is observed by an atomic force microscope (AFM), AFM images of the section and the surface S are obtained.

In the AFM image of the surface, the image in the most superficial side is obtained as a bright image, whereas the image of the deepest side is obtained as a dark image. If a bright image is formed like an island in a dark image, it is determined that the surface has a convex portion.

Conversely, if a dark image is formed like an island in a bright image, it is determined that the surface has a concave portion.

Figure 1B:
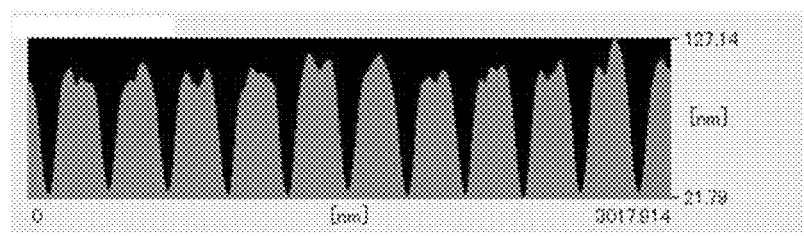
FIG. 1B is a cross sectional view along the a-a line in FIG. 1A.
Figure 2A:
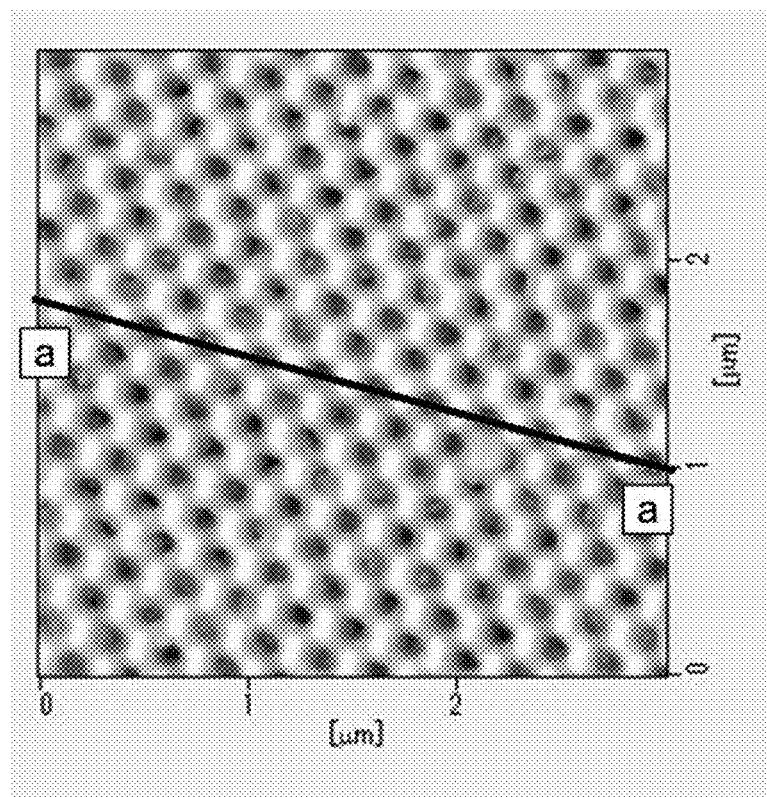
FIG. 2A is an AFM image showing an example of a surface of a hydrophilic resin layer having concave portions.
Figure 2B:
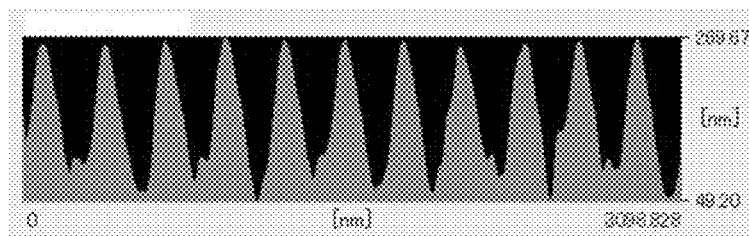
FIG. 2B is a cross sectional view along the a-a line in FIG. 2A.

For example, the surface of a hydrophilic resin layer providing AFM images of the surface and section shown in FIG. 1A and FIG. 1B, respectively, has convex portions. The surface of a hydrophilic resin layer providing AFM images of the surface and section shown in FIG. 2A and FIG. 2B, respectively, has concave portions.

The average surface area ratio of the surface of the hydrophilic resin layer, which is not particularly limited and can be appropriately selected depending upon the purpose, is preferably 1.10 or more, more preferably 1.30 or more, and particularly preferably 1.40 or more. The surface area ratio refers to a ratio of the surface area of the objects formed in a predetermined region relative to the area of the predetermined area (surface area/area). If the average surface area ratio falls within the preferable range mentioned above, a hydrophilic component deposited onto the hydrophilic resin layer effectively spreads in wet condition. If the average surface area ratio falls within the particularly preferable range, a hydrophilic component significantly effectively spreads in wet condition.

The average surface area ratio of the surface of the hydrophilic resin layer herein can be measured as follows.

The surface S of the hydrophilic resin layer having convex portions or concave portions is observed by an atomic force microscope (AFM), an AFM image of the surface S is obtained. This procedure is repeated with respect to 10 sites randomly selected from the surface of the hydrophilic resin layer to obtain surface area S1, S2, . . . , S10. Next, the ratios of these surface areas S1, S2, . . . , S10 relative to the area of the corresponding observation areas (surface area/area) SR1, SR2, . . . , SR10 are simply averaged (arithmetic average) to obtain the average surface area ratio SRm of the surface of the hydrophilic resin layer.

—Pure Water Contact Angle—

The pure water contact angle of the surface of the hydrophilic resin layer is less than 40°, preferably 20° or less, more preferably 15° or less, and particularly preferably 10° or less. The lower limit of the pure water contact angle, which is not particularly limited and can be appropriately selected depending upon the purpose; is for example, 5°.

The pure water contact angle can be measured by a slide drop method by use of, for example, PCA-1 (manufactured by Kyowa Interface Science Co., Ltd.) in the following conditions.

Distillation water is placed in a plastic syringe. To the tip of the syringe, a stainless steel needle is attached. The distillation water is allowed to drip on an evaluation surface.

The amount of water to be dripped: 2 μL

The measurement temperature: 25° C.

—Active Energy Ray Curable Resin Composition—

The active energy ray curable resin composition is not particularly limited and can be appropriately selected depending upon the purpose. For example, an active energy ray curable resin composition containing at least a hydrophilic monomer and a photopolymerization initiator, and further containing other components as necessary, is mentioned.

—Hydrophilic Monomer—

Examples of the hydrophilic monomer include a polyoxyalkyl-containing (meth)acrylate, a quaternary ammonium salt-containing (meth)acrylate, a tertiary amino group-containing (meth)acrylate, a sulfonic acid group-containing monomer, carboxylic acid group-containing monomer, phosphoric acid group-containing monomer and a phosphonic acid group-containing monomer.

In the present invention, the (meth)acrylate refers to an acrylate or a methacrylate. The same applied to (meth)acryloyl and (meth)acryl.

Examples of the polyoxyalkyl-containing (meth)acrylate include mono- or poly-acrylates or mono- or poly-methacrylates obtained by the reaction between a polyhydric alcohol (polyol or polyhydroxy-containing compound) and a compound selected from the group consisting of an acrylic acid, a methacrylic acid and derivatives thereof. Examples of the polyhydric alcohol include divalent alcohols, trivalent alcohols and quadrivalent or larger valent alcohols. Examples of the divalent alcohols include ethylene glycol, diethylene glycol, triethylene glycol, tetraethylene glycol, polyethylene glycol having a number average molecular weight of 300 to 1,000, propylene glycol, dipropylene glycol, 1,3-propanediol, 1,4-butanediol, 1,5-pentanediol, 1,6-hexanediol, neopentyl glycol, 2-ethyl-1,3-hexanediol, 2,2'-thiodiethanol and 1,4-cyclohexanedimethanol. Examples of the trivalent alcohols include trimethylolethane, trimethylolpropane, pentaglycerol, glycerol, 1,2,4-butanetriol and 1,2,6-hexanetriol. Examples of the quadrivalent or larger valent alcohols include pentaerythritol, diglycerol and dipentaerythritol.

Examples of the polyoxyalkyl-containing (meth)acrylate include polyethylene glycol (meth)acrylate and polypropylene glycol (meth)acrylate. Examples of the polyethylene glycol (meth)acrylate include methoxy polyethylene glycol (meth)acrylate. The molecular weight of the polyethylene glycol unit of the polyethylene glycol (meth)acrylate, which is not particularly limited and can be appropriately selected depending upon the purpose, is for example, 300 to 1,000. As the methoxy polyethylene glycol (meth)acrylate, a commercially available product can be used. Examples of the commercially available product include MEPM-1000 (manufactured by Dai-ichi Kogyo Seiyaku Co., Ltd.).

Of them, polyethylene glycol (meth)acrylate is preferable and methoxy polyethylene glycol (meth)acrylate is more preferable.

Examples of the quaternary ammonium salt-containing (meth)acrylate include (meth)acryloyloxyethyltrimethylammonium chloride, (meth)acryloyloxyethyldimethylbenzylammonium chloride, (meth)acryloyloxyethyldimethylglycidylammonium chloride, (meth)acryloyloxyethyltrimethylammoniummethyl sulfate, (meth)acryloyloxydimethylethylammoniumethyl sulfate, (meth)acryloyloxyethyltrimethylammonium-p-toluene sulfonate, (meth)acrylamidepropyltrimethylammonium chloride, (meth)acrylamidepropyldimethylbenzylammonium chloride, (meth)acrylamidepropyldimethylglycidylammonium chloride, (meth)acrylamidepropyltrimethylammoniummethyl sulfate, (meth)acrylamidepropyldimethylethylammoniumethyl sulfate and (meth)acrylamidepropyltrimethylammonium-p-toluene sulfonate.

Examples of the tertiary amino group-containing (meth)acrylate include N,N-dimethylaminoethyl(meth)acrylate, N,N-dimethylaminopropyl(meth)acrylamide, diethylaminopropyl(meth)acrylamide, 1,2,2,6,6-pentamethylpiperidyl(meth)acrylate and 2,2,6,6-tetramethylpiperidyl(meth)acrylate.

Examples of the sulfonic acid group-containing monomer include vinylsulfonic acid, allylsulfonic acid, vinyltoluenesulfonic acid, styrenesulfonic acid and sulfonic acid group-containing (meth)acrylate. Examples of the sulfonic acid group-containing (meth)acrylate include sulfoethyl (meth)acrylate, sulfopropyl (meth)acrylate, 2-acrylamide-2-methylpropanesulfonic acid and terminal sulfonic acid modified polyethylene glycol mono(meth)acrylate. These may form salts. Examples of the salts include a sodium salt, a potassium salt, and an ammonium salt.

Examples of the carboxylic acid group-containing monomer include acrylic acid and methacrylic acid.

Examples of the phosphoric acid group-containing monomer include (meth)acrylate having a phosphoric acid ester.

The hydrophilic monomer is preferably a single functional hydrophilic monomer.

The molecular weight of the hydrophilic monomer, which is not particularly limited and can be appropriately selected depending upon the purpose, is preferably 200 or more.

The content of the hydrophilic monomer in the active energy ray curable resin composition, which is not particularly limited and can be appropriately selected depending upon the purpose, is preferably 15 mass % to 99.9 mass %, more preferably 20 mass % to 90 mass %, and particularly preferably 25 mass % to 50 mass %.

In place of the hydrophilic monomer, a polymer to which one or more photosensitive groups selected from an azido group, a phenyl azido group, a quinone azido group, a stilbene group, a chalcone group, a diazonium base, a cinnamon acid group and an acrylic acid group are introduced, may be used. Examples of the polymer include a polyvinyl alcohol polymer, a polyvinylbutyral polymer, a polyvinylpyrrolidone polymer, a polyacrylamide polymer, a polyvinyl acetate polymer and a polyoxyalkylene polymer.

—Photopolymerization Initiator—

Examples of the photopolymerization initiator include a photoradical polymerization initiator, a photo-acid generating agent, a bisazido compound, hexamethoxymethylmelamine and tetramethoxy glycoluril.

Examples of the photoradical polymerization initiator, which is not particularly limited and can be appropriately selected depending upon the purpose, include ethoxyphenyl (2,4,6-trimethylbenzoyl)phosphine oxide, bis(2,6-dimethylbenzoyl)-2,4,4-trimethylpentylphosphine oxide, bis(2,4,6-trimethylbenzoyl)-2,4,4-trimethylpentylphosphine oxide, bis(2,6-dichlorobenzoyl)-2,4,4-trimethylpentylphosphine oxide, 1-phenyl-2-hydroxy-2-methylpropan-1-on, 1-hydroxycyclohexylphenyl ketone, 1-(4-isopropylphenyl)-2-hydroxy-2-methylpropan-1-on, 1,2-diphenylethanedione and methylphenylglyoxylate.

The content of the photopolymerization initiator in the active energy ray curable resin composition, which is not particularly limited and can be appropriately selected depending upon the purpose, is preferably 0.1 mass % to 10 mass %, more preferably 0.5 mass % to 8 mass %, and particularly preferably 1 mass % to 5 mass %.

—Other Components—

Examples of the other components, which are not particularly limited and can be appropriately selected depending upon the purpose, include urethane (meth)acrylate, an isocyanuric acid group-containing (meth)acrylate and a filler.

These are sometimes used for controlling elongation percentage and hardness, etc. of the hydrophilic resin layer.

Examples of the urethane (meth)acrylate, which is not particularly limited and can be appropriately selected depending upon the purpose, include an aliphatic urethane (meth)acrylate and an aromatic urethane (meth)acrylate. Of them, an aliphatic urethane (meth)acrylate is preferable.

The content of the urethane (meth)acrylate in the active energy ray curable resin composition, which is not particularly limited and can be appropriately selected depending upon the purpose, is preferably 10 mass % to 45 mass %, more preferably 15 mass % to 40 mass %, and particularly preferably 20 mass % to 35 mass %.

Examples of the isocyanuric acid group-containing (meth)acrylate, which is not particularly limited and can be appropriately selected depending upon the purpose, include an ethoxylated isocyanuric acid (meth)acrylate. Of them, an ethoxylated isocyanuric acid (meth)acrylate is preferable.

The content of the isocyanuric acid group-containing (meth)acrylate in the active energy ray curable resin composition, which is not particularly limited and can be appropriately selected depending upon the purpose, is preferably 10 mass % to 45 mass %, more preferably 15 mass % to 40 mass %, and particularly preferably 20 mass % to 35 mass %.

Examples of the filler, which is not particularly limited and can be appropriately selected depending upon the purpose, include silica, zirconia, titania, tin oxide, indium tin oxide, antimony-doped tin oxide and antimony pentoxide. Examples of the silica include solid silica and hollow silica.

The active energy ray curable resin composition is diluted with an organic solvent and put in use. Examples of the organic solvent include an aromatic solvent, an alcohol solvent, an ester solvent, a ketone solvent, a glycol ether solvent, a glycol ether ester solvent, a chlorine solvent, an ether solvent, N-methylpyrrolidone, dimethylformamide, dimethylsulfoxide and dimethylacetamide.

The active energy ray curable resin composition is cured by irradiation of an active energy ray. Examples of the active energy ray, which is not particularly limited and can be appropriately selected depending upon the purpose, include an electron beam, a UV ray, an infrared ray, a laser beam, a visible ray, ionizing radiation (X ray, an α ray, a β ray, a γ ray, etc.), a microwave and a high-frequency wave.

The Martens hardness of the hydrophilic resin layer, which is not particularly limited and can be appropriately selected depending upon the purpose, is preferably 50 $N/mm^2$ to 300 $N/mm^2$, more preferably 50 $N/mm^2$ to 290 $N/mm^2$, and particularly preferably 50 $N/mm^2$ to 280 $N/mm^2$. In molding process of the hydrophilic laminate, more specifically, in injection molding of a polycarbonate, a hydrophilic laminate is heated and pressed at 290° C. and at a pressure of 200 MPa. At this time, micro convex portions or micro concave portions in the surface of the hydrophilic resin layer sometimes deform. For example, the height of the micro convex portions decreases and the depth of micro concave portions decreases. Deformation is acceptable as long as the antifogging performance is not affected; however, if deformation is excessively large, the pure water contact angle increases and antifogging performance deteriorates. If the Martens hardness is less than 50 $N/mm^2$, micro convex portions or micro concave portions in the surface of the hydrophilic resin layer is excessively deformed in a molding process of the hydrophilic laminate, the pure water contact angle increases and antifogging performance deteriorates. In addition, the hydrophilic resin layer is easily cracked in handling during a production or molding process of the hydrophilic laminate and in surface cleaning during ordinary use. In contrast, if the Martens hardness exceeds 300 $N/mm^2$, the hydrophilic resin layer is sometimes cracked and peels during a molding process. It is advantageous that the Martens hardness falls within the particularly preferable range, since the hydrophilic laminate can be easily molded into various three-dimensional shapes without deteriorating antifogging performance and without producing defects such as flaw, crack and peel-off.

Note that after the molding process of the hydrophilic laminate, since high temperature and high pressure are applied to the hydrophilic resin layer in the injection molding step, the Martens hardness of the hydrophilic resin layer sometimes increases than before the molding process.

The Martens hardness can be measured, for example, by means of PICODENTOR HM500 (trade name; manufactured by Fischer Instruments K.K.) by applying a load (1 mN/20 s) and using a diamond cone as a needle, at a face angle of 136°.

The pencil hardness of the hydrophilic resin layer, which is not particularly limited and can be appropriately selected depending upon the purpose, is preferably B to 4H, more preferably HB to 4H, and particularly preferably F to 4H. If the pencil hardness is less than B (softer than B), the hydrophilic resin layer is easily cracked in handling during a production or molding process of the hydrophilic laminate and in surface cleaning during ordinary use. In addition, in a molding process of the hydrophilic laminate, micro convex portions or micro concave portions in the surface of the hydrophilic resin layer excessively deforms, with the result that pure water contact angle increases and antifogging performance sometimes deteriorates. In contrast, if the pencil hardness exceeds 4H (harder than 4H), the hydrophilic resin layer sometimes cracks and peels during a molding process. It is advantageous that the pencil hardness falls within the particularly preferable range, since the hydrophilic laminate can be easily molded into various three-dimensional shapes without deteriorating antifogging performance and without producing defects such as flaw, crack and peel-off.

Note that after the molding process of the hydrophilic laminate, since high temperature and high pressure are applied to the hydrophilic resin layer in the injection molding step, the pencil hardness of the hydrophilic resin layer sometimes increases than before the molding process.

The pencil hardness is measured in accordance with JIS K 5600-5-4.

The average thickness of the hydrophilic resin layer, which is not particularly limited and can be appropriately selected depending upon the purpose, is preferably 1 µm to 100 µm, more preferably 1 µm to 50 µm, and particularly preferably 1 µm to 30 µm.

<Other Members>

As other members, an anchor layer, etc. are mentioned.

—Anchor Layer—

The anchor layer is a layer which is provided between the substrate made of a resin and the hydrophilic resin layer.

Owing to the presence of the anchor layer, adhesion between the substrate made of a resin and the hydrophilic resin layer can be improved.

The refractive index of the anchor layer is preferably close to the refractive index of the hydrophilic resin layer in order to prevent interference irregularity. For this reason, the refractive index of the anchor layer falls preferably within ±0.10 of the refractive index of the hydrophilic resin layer and more preferably within ±0.05. Alternatively, the refractive index of the anchor layer is preferably between the refractive index of the hydrophilic resin layer and the refractive index of the substrate made of a resin.

The anchor layer can be formed by applying, for example, an active energy ray curable resin composition. As the active energy ray curable resin composition, for example, an active energy ray curable resin composition containing at least urethane (meth)acrylate and a photopolymerization initiator, and further containing other components as necessary is mentioned. As the urethane (meth)acrylate and the photopolymerization initiator, the same examples of the urethane (meth)acrylates and the photopolymerization initiators as described in the section where the hydrophilic resin layer is explained, are respectively mentioned. Examples of the application method for coating, which is not particularly limited and can be appropriately selected depending upon the purpose, include wire bar coating, blade coating, spin coating, reverse roll coating, die coating, spray coating, roll coating, gravure coating, microgravure coating, lip coating, air knife coating, curtain coating, a comma coat method and a dipping method.

The average thickness of the anchor layer, which is not particularly limited and can be appropriately selected depending upon the purpose, is preferably 0.01 µm to 10 µm, more preferably 0.1 µm to 5 µm, and particularly preferably 0.3 µm to 3 µm.

Note that a reflectivity-reducing function and an antistatic function may be imparted to the anchor layer.

The elongation percentage of the hydrophilic laminate, which is not particularly limited and can be appropriately selected depending upon the purpose, is preferably 10% or more, more preferably 10% to 200% and particularly preferably 40% to 150%. If the elongation percentage is less than 10%, it is sometimes difficult to perform molding processing. It is advantageous that the elongation percentage falls within the particularly preferable range since molding processability is excellent.

The elongation percentage is obtained, for example, by the following method.

The hydrophilic laminate is cut into rectangular pieces of 10.5 cm in length×2.5 cm in width and used as measurement samples. The tension-elongation percentage of the measurement samples obtained is measured by a tension-tester (autograph AG-5kNX plus, manufactured by Shimadzu Corporation) in measurement conditions (tension rate=100 mm/min; distance between chucks=8 cm). In measurement of the elongation percentage, measurement temperature varies depending upon the type of resin constituting a substrate. The elongation percentage is measured at a temperature near the softening point of the substrate made of a resin or the softening point or more, more specifically, a temperature between 10° C. to 250° C. For example, if the resin substrate is made of polycarbonate or a PC/PMMA laminate, the elongation percentage is preferably measured at 190° C.

It is preferable that the hydrophilic laminate has a small difference in rate of in-plane heat shrinkage between the X direction and the Y direction. The X direction and the Y direction of the hydrophilic laminate are defined as follows. For example, if the hydrophilic laminate is a roll, the X direction and the Y direction correspond to the longitudinal direction and the width direction of the roll, respectively. It is preferable that the difference in rate of heat shrinkage between the X direction and the Y direction of the hydrophilic laminate at the heating temperature employed in the heating step during molding, falls within 5%. If the difference is outside the range, the hydrophilic resin layer is peeled and cracked during a molding process, and letters, patterns and images printed on the surface of a substrate made of a resin deform or shift in position, with the result that it becomes sometime difficult to apply a molding process.

The hydrophilic laminate is a film particularly suitable for in-mold forming and insert molding.

As a method for manufacturing the hydrophilic laminate, which is not particularly limited and can be appropriately selected depending upon the purpose, a method for manufacturing the hydrophilic laminate of the present invention (described later) is preferable.

(Method for Manufacturing Hydrophilic Laminate)

A method for manufacturing the hydrophilic laminate of the present invention includes at least: an uncured resin layer forming step, and a hydrophilic resin layer forming step; and further includes other steps as necessary.

The method for manufacturing the hydrophilic laminate is a method for manufacturing the hydrophilic laminate of the present invention.

<Uncured Resin Layer Forming Step>

The uncured resin layer forming step is not particularly limited and can be appropriately selected depending upon the purpose, as long as the step is a step of applying an active energy ray curable resin composition to a substrate made of a resin to form an uncured resin layer.

Examples of the substrate made of a resin, which is not particularly limited and can be appropriately selected depending upon the purpose, include examples of the substrate made of a resin described in the section where the hydrophilic laminate of the present invention is explained.

Examples of the active energy ray curable resin composition, which is not particularly limited and can be appropriately selected depending upon the purpose, include examples of the active energy ray curable resin composition described in the section where the hydrophilic resin layer for the hydrophilic laminate of the present invention is explained.

The uncured resin layer is formed by applying the active energy ray curable resin composition to the substrate made of a resin and drying the composition as necessary. The uncured resin layer may be a solid film or a film having flowability due to a curable component of low molecular weight contained in the active energy ray curable resin composition.

Examples of the application method for coating, which is not particularly limited and can be appropriately selected depending upon the purpose, include wire bar coating, blade coating, spin coating, reverse roll coating, die coating, spray coating, roll coating, gravure coating, microgravure coating, lip coating, air knife coating, curtain coating, a comma coat method and a dipping method.

The uncured resin layer remains uncured since the layer is not irradiated with an active energy ray.

In the uncured resin layer forming step, if an anchor layer is formed on the substrate made of a resin, the active energy ray curable resin composition may be applied to the anchor layer to form the uncured resin layer.

Examples of the anchor layer, which is not particularly limited and can be appropriately selected depending upon the purpose, include examples of the anchor layers described in the section where the hydrophilic laminate of the present invention is explained.

<Hydrophilic Resin Layer Forming Step>

The hydrophilic resin layer forming step is not particularly limited and can be appropriately selected depending upon the purpose as long as the step is a step of forming a hydrophilic resin layer by bringing a transfer matrix having micro convex portions or micro concave portions into contact with the uncured resin layer, and irradiating the uncured resin layer in contact with the transfer matrix with an active energy ray to cure the uncured resin layer, thereby transferring the micro convex portions or the micro concave portions.

—Transfer Matrix—

The transfer matrix has micro convex portions or micro concave portions.

The material, size and structure of the transfer matrix are not particularly limited and can be appropriately selected depending upon the purpose.

A method for forming micro convex portions or micro concave portions of the transfer matrix, which is not particularly limited and can be appropriately selected depending upon the purpose, is preferably etching of the surface of the transfer matrix with a photoresist having predetermined pattern shape used as a protection film, or laser processing of the transfer matrix by irradiating the surface of the transfer matrix with a laser.

—Active Energy Ray—

The active energy ray is not particularly limited and can be appropriately selected depending upon the purpose, as long as the uncured resin layer can be cured by the active energy ray. Examples of the active energy ray include those described in the section where the hydrophilic laminate of the present invention is explained.

Herein, specific examples of the hydrophilic resin layer forming step will be described with reference to drawings.

[First Embodiment]

The first embodiment is directed to a hydrophilic resin layer forming step performed by using a transfer matrix having micro convex portions or micro concave portions which are formed by etching a surface of the transfer matrix with a photoresist having a predetermined pattern shape used as a protection film.

First, a transfer matrix and a method for manufacturing the transfer matrix will be described.

[Structure of Transfer Matrix]

Figure 3A:
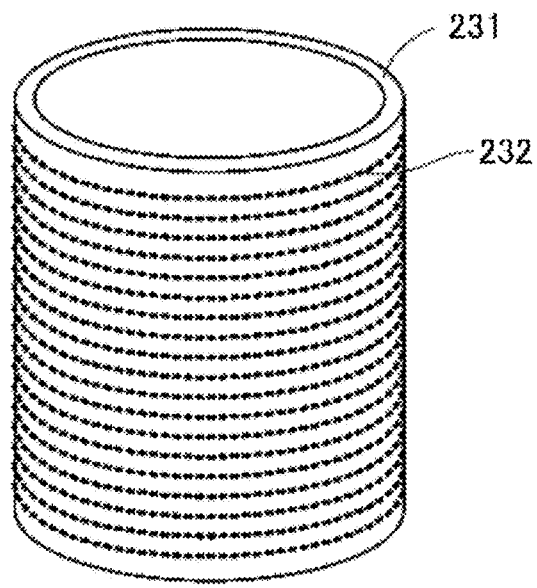
FIG. 3A is a perspective view showing an example of the constitution of a roll matrix that is a transfer matrix.
Figure 3B:
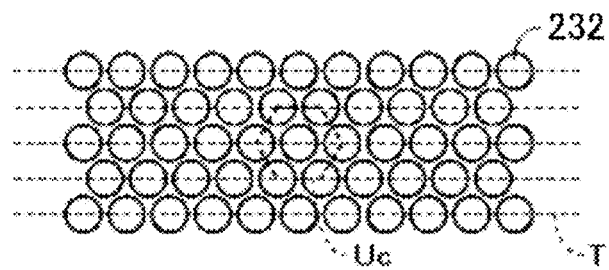
FIG. 3B is a plane view represented by enlarging a part of the roll matrix shown in FIG. 3A.
Figure 3C:
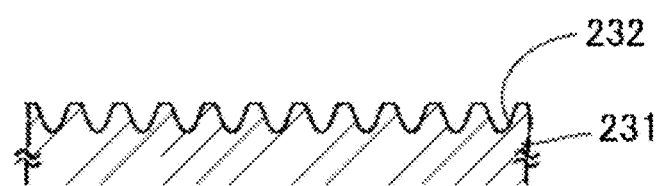
FIG. 3C is a cross sectional view along the track T in FIG. 3B.

FIG. 3A is a perspective view showing a structure of a roll matrix serving as a transfer matrix. FIG. 3B is a magnified plan view of a part of the roll matrix shown in FIG. 3A. FIG. 3C is a sectional view taken along the line of track T in FIG. 3B. A roll matrix 231 is a transfer matrix for use in preparing a hydrophilic laminate having the aforementioned constitution, and more specifically is a matrix for molding a plurality of convex portions or concave portions in the surface of the hydrophilic resin layer. The roll matrix 231 has, for example, a columnar or cylindrical shape and the columnar surface or cylinder surface serves as a molding surface for forming a plurality of convex portions or concave portions on the surface of a hydrophilic resin layer. In the molding surface, for example, a plurality of structures 232 are two-dimensionally arranged. In FIG. 3C, the structure 232 has a concave state relative to the molding surface. As the material for the roll matrix 231, for example, glass can be used; however the material is not particularly limited to glass.

A plurality of structures 232 arranged in the molding surface of the roll matrix 231 and a plurality of convex portions or concave portions arranged in the surface of the hydrophilic resin layer have mutually inverted convexoconcave patterns. To be more specific, the array, size, shape, arrangement pitch, height or depth and aspect ratio, etc. of the structures 232 of the roll matrix 231 are identical with those of the convex portions or concave portions of the hydrophilic resin layer.

[Roll-Matrix Exposure Apparatus]

Figure 4:
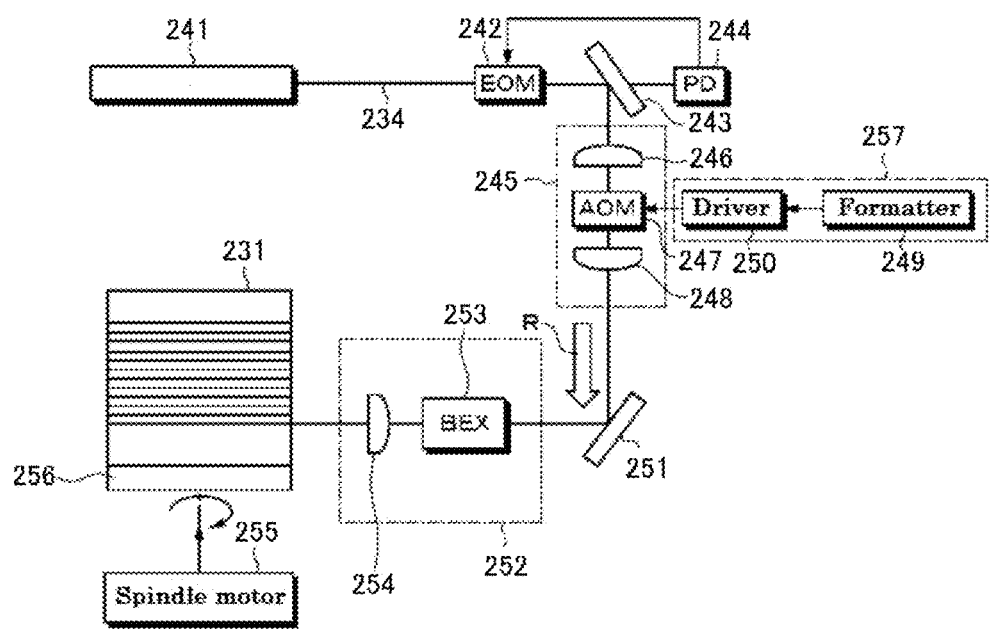
FIG. 4 is a schematic diagram showing an example of the constitution of an exposure apparatus for a roll matrix for preparing a roll matrix.

FIG. 4 is a schematic view showing a structure of a roll-matrix exposure apparatus for preparing a roll matrix. The roll-matrix exposure apparatus is constituted based on an optical disk recording apparatus.

A laser beam source 241 is a light source for exposing with light a resist applied to the surface of the roll matrix 231 as a recording medium. The source 241 emits, for example, a laser beam 234 having a wavelength of $\lambda=266$ nm, for recording. The laser beams 234 emitted from the laser beam source 241 linearly proceed while maintaining parallel state, and enter an electro optical modulator (EOM) 242. The laser beam 234 passed through the electro optical modulator 242 is reflected by a mirror 243 and guided into an optical modulation system 245.

The mirror 243, which is constituted of a polarization beam splitter, has a function of reflecting one of polarized components and transmitting the other polarized component. The polarized component passed through the mirror 243 is received by a photodiode 244. The electro optical modulator 242 is controlled based on the received signal to perform phase modulation of the laser beam 234.

In the optical modulation system 245, the laser beam 234 is collected via a condensing lens 246 by an acousto-optic modulator (AOM) 247 formed of glass ($SiO_2$), etc. The laser beam 234 is modified in intensity by the acousto-optic modulator 247 and emitted, and then, changed into parallel beams by a lens 248. The laser beam 234 emitted from the optical modulation system 245 is reflected by a mirror 251 and guided onto a movable optical table 252 horizontally in parallel.

The movable optical table 252 has a beam expander 253 and an objective lens 254. The laser beam 234 guided to the movable optical table 252 is shaped into a desired beam shape by the beam expander 253, and emitted via the objective lens 254 to the resist layer on the roll matrix 231. The roll matrix 231 is placed on a turn table 256 connected to a spindle motor 255. While rotating the roll matrix 231 and simultaneously moving the laser beam 234 in the height direction of the roll matrix 231, to the resist layer formed on the peripheral side surface of the roll matrix 231 is intermittently irradiated with the laser beam 234. In this manner, a step of exposing the resist layer with light is carried out. The formed latent image has a substantially ellipsoid shape having a major axis along the circumferential direction. The laser beam 234 is moved by moving the movable optical table 252 in the direction indicated by arrow R.

The light exposure apparatus has a control mechanism 257 for forming latent images corresponding to a two-dimensional pattern of the aforementioned convex portions or concave portions, on the resist layer. The control mechanism 257 has a formatter 249 and a driver 250. The formatter 249 has a polarity reversion portion. The polarity reversion portion controls application timing of the laser beam 234 to the resist layer. The driver 250 controls the acousto-optic modulator 247 in response to output of the polarity reversion portion.

In the roll-matrix exposure apparatus, so as to spatially link the two-dimensional patterns, a signal is generated track by track by operating the polarity reversion formatter in synchronism with a rotation controller. In this manner, the intensity is modified by the acousto-optic modulator 247. Patterning is performed at a constant angular velocity (CAV), an appropriate rotation number, an appropriate modulation frequency and an appropriate feed pitch. In this manner, a two-dimensional pattern such as a hexagonal lattice pattern can be recorded.

[Resist Film Formation Step]

Figure 5A:
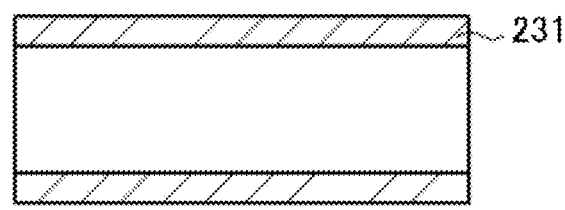
FIG. 5A is a process drawing for describing an example of a process for preparing a roll matrix.
Figure 5B:
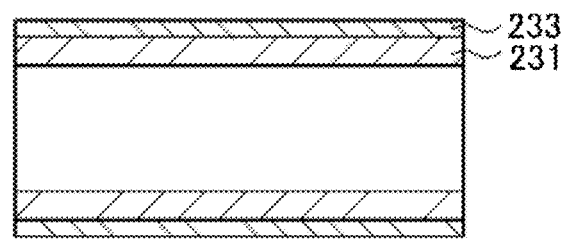
FIG. 5B is a process drawing for describing an example of a process for preparing a roll matrix.

First, as shown in the sectional view of FIG. 5A, a columnar or cylindrical roll matrix 231 is prepared. The roll matrix 231 is, for example, a glass matrix. Next, as shown in the sectional view of FIG. 5B, a resist layer (for example, photoresist) 233 is formed on the surface of the roll matrix 231. Examples of the material for the resist layer 233 include organic resists and inorganic resists. Examples of the organic resists include a Novolak resist and a chemical amplification resist. Examples of the inorganic resist include metal compounds.

[Light Exposure Step]

Figure 5C:
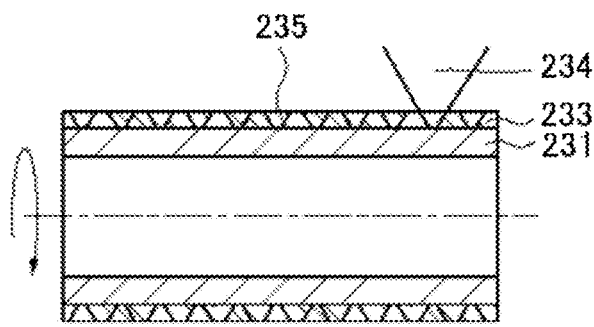
FIG. 5C is a process drawing for describing an example of a process for preparing a roll matrix.

Next, as shown in the sectional view of FIG. 5C, the resist layer 233 formed on the surface of the roll matrix 231 is irradiated with the laser beam (light exposure beam) 234. To describe more specifically, on the turn table 256 of the roll-matrix exposure apparatus shown in FIG. 4, the roll matrix 231 is placed. The roll matrix 231 is rotated; at the same time, the resist layer 233 is irradiated with the laser beam (light exposure beam) 234. At this time, the resist layer is intermittently irradiated with the laser beam 234 while moving the laser beam 234 in the height direction (direction in parallel to the center axis of the columnar or cylindrical roll matrix 231) of the roll matrix 231 to expose the entire surface of the resist layer 233 with light. In this manner, latent images 235 are formed over the entire surface of the resist layer 233 in accordance with the track of the laser beam 234.

The latent images 235 are arranged so as to form, for example, a plurality of tracks T in the roll matrix surface; at the same time, a periodical pattern of a predetermined unit cell Uc is formed. Each of the latent images 235 has, for example, a circular or elliptical shape. If the latent image 235 has an elliptical shape, it is preferable that the elliptical shape has a major axis in parallel in the extension direction of track T.

[Development Step]

Figure 5D:
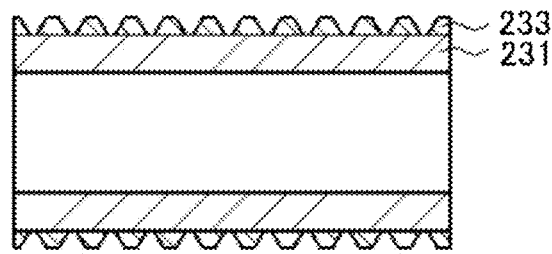
FIG. 5D is a process drawing for describing an example of a process for preparing a roll matrix.

Next, for example, while rotating the roll matrix 231, a developer is dripped onto the resist layer 233 to develop the resist layer 233. In this manner, as shown in the sectional view of FIG. 5D, a plurality of opening portions are formed in the resist layer 233. If the resist layer 233 is formed of a positive-type resist, the light exposure portion exposed to the laser beam 234 is increased in dissolution rate to the developer compared to non-light exposure portion. As a result, as shown in the sectional view of FIG. 5D, the pattern reflecting the latent images (light exposure portion) 235 is formed on the resist layer 233. The pattern reflecting the opening portions is, for example, a pattern where a predetermined unit cell Uc regularly and periodically appears.

[Etching Step]

Figure 5E:
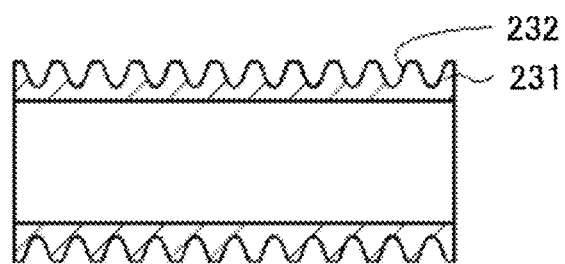
FIG. 5E is a process drawing for describing an example of a process for preparing a roll matrix.

Next, the surface of the roll matrix 231 is etched with the pattern (resist pattern) of the resist layer 233 formed on the roll matrix 231 used as a mask. In this manner, a cone-shaped structure (concave portion) 232 can be obtained as shown in the sectional view of FIG. 5E. The cone shape is preferably an elliptical cone shape or a truncated elliptical cone shape having a major axis, for example, in parallel to the extending direction of track T. As the etching, for example, dry etching and wet etching can be used. At this time, if an etching process and an ashing process are alternately performed, for example, a pattern of the cone-shaped structure 232 can be formed. In the manner mentioned above, the desired roll matrix 231 can be obtained.

[Transfer Treatment]

Figure 6A:
FIG. 6A is a process drawing for describing an example of a process for transferring micro convex portions or concave portions by a roll matrix.

As shown in the sectional view of FIG. 6A, a substrate 211 made of a resin having an uncured resin layer 236 formed thereon is prepared.

Figure 6B:
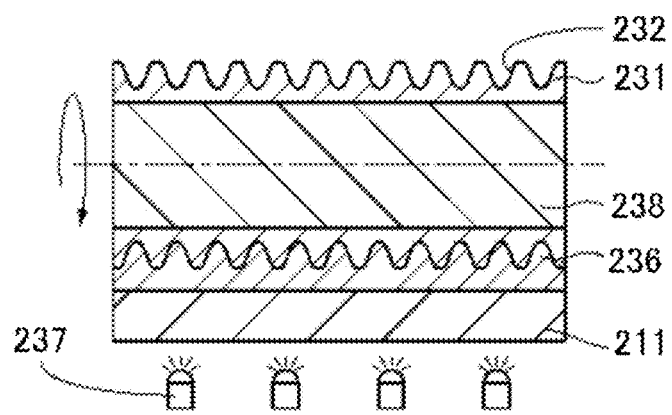
FIG. 6B is a process drawing for describing an example of a process for transferring micro convex portions or concave portions by a roll matrix.

Next, as shown in the sectional view of FIG. 6B, the roll matrix 231 is brought into contact with the uncured resin layer 236 formed on the substrate 211 made of a resin. The uncured resin layer 236 is irradiated with an active energy ray 237 to cure the uncured resin layer 236. In this manner, micro convex portions or micro concave portions is transferred to obtain a hydrophilic resin layer 212 having micro convex portions or micro concave portions 212a formed therein.

Figure 6C:
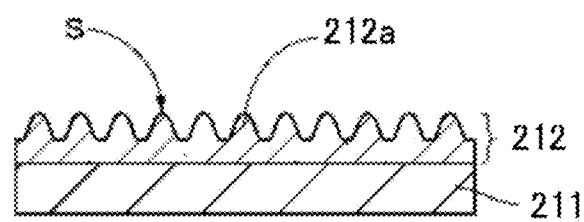
FIG. 6C is a process drawing for describing an example of a process for transferring micro convex portions or concave portions by a roll matrix.

Finally, the obtained hydrophilic resin layer 212 is removed from the roll matrix 231 to obtain a hydrophilic laminate (FIG. 6C).

Note that if the substrate 211 made of a resin is formed of a material which cannot transmit an active energy ray such as ultraviolet rays, it is possible that the roll matrix 231 is formed of a material which can transmit an active energy ray (for example, quartz) and the uncured resin layer 236 is irradiated with an active energy ray from the interior portion of the roll matrix 231. Note that the transfer matrix is not limited to the aforementioned roll matrix 231 and a flat plate-form matrix may be used. However, in view of increasing the amount of production, the aforementioned roll matrix 231 is preferably used as a transfer matrix.

[Second Embodiment]

The second embodiment is directed to the hydrophilic resin layer forming step performed by using a transfer matrix having micro convex portions or micro concave portions which are formed by laser processing of the transfer matrix by irradiating the surface of the transfer matrix with the laser.

First, a transfer matrix and a method for manufacturing the transfer matrix will be described.

[Structure of Transfer Matrix]

Figure 7A:
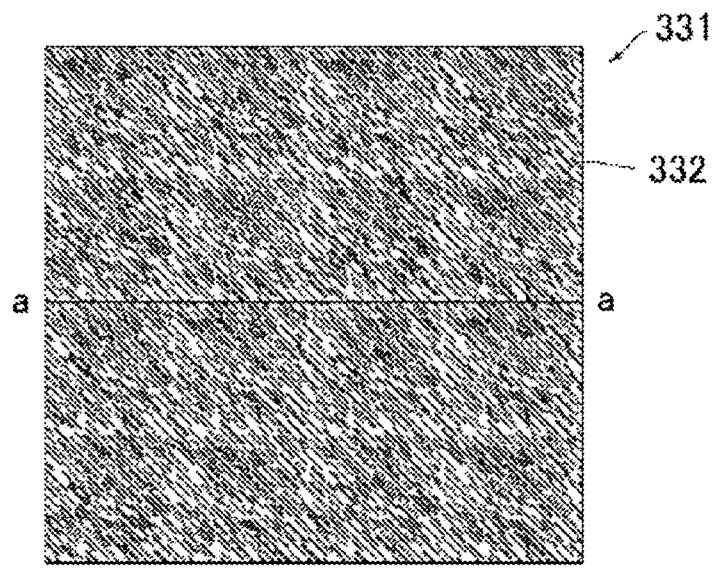
FIG. 7A is a plane view showing an example of the constitution of a sheet-like matrix that is a transfer matrix.
Figure 7B:
FIG. 7B is a cross sectional view along the a-a line shown in FIG. 7A.
Figure 7C:
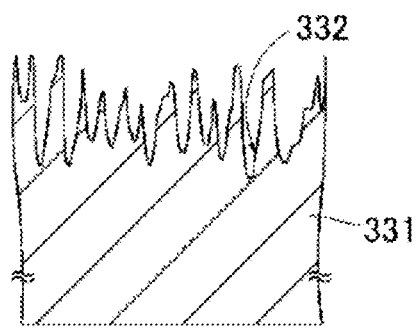
FIG. 7C is a cross sectional view represented by enlarging a part of FIG. 7B.

FIG. 7A is a plan view showing a structure of a plate-form matrix. FIG. 7B is a sectional view taken long the line a-a, shown in FIG. 7A. FIG. 7C is a magnified sectional view of a part of the section shown in FIG. 7B. A plate-form matrix 331 is a matrix for use in preparing a hydrophilic laminate having the aforementioned constitution, more specifically, a matrix for molding a plurality of convex portions or concave portions in the surface of the hydrophilic resin layer. The plate-form matrix 331 has a surface having, for example, a micro convexoconcave structure formed therein, and the surface serves as a molding surface for forming a plurality of convex portions or concave portions in the surface of a hydrophilic resin layer. In the molding surface, for example, a plurality of structures 332 are provided. The structure 332 shown in FIG. 7C has a concave state relative to the molding surface. As the material for the plate-form matrix 331, for example, a metal material can be used. Examples of the metal material that can be used include Ni, NiP, Cr, Cu, Al, Fe and its alloy. As the alloy, stainless steel (SUS) is preferable. Examples of the stainless steel (SUS) include, but not limited to, SUS304 and SUS420J2.

A plurality of structures 332 provided in the molding surface of the plate-form matrix 331 and a plurality of convex portions or concave portions provided in the surface of the hydrophilic resin layer have mutually inverted convexoconcave patterns. More specifically, the array, size, shape, arrangement pitch and height or depth etc. of the structures 332 of the plate-form matrix 331 are the same as those of the convex portions or concave portions of the hydrophilic resin layer.

[Structure of Laser Processing Apparatus]

Figure 8:
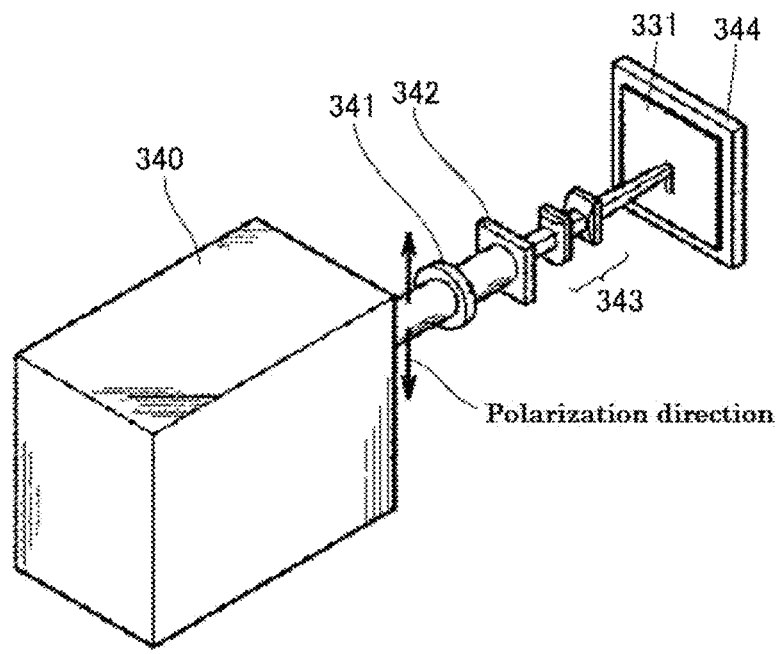
FIG. 8 is a schematic diagram for showing an example of the constitution of a laser processing apparatus for preparing a sheet-like matrix.

FIG. 8 is a schematic view showing a structure of a laser processing apparatus for preparing a plate-form matrix. The laser main-body 340 is, for example, IFRIT (trade name, manufactured by Cyber Laser Inc.). The wavelength of the laser to be used for laser processing is, for example, 800 nm; however, the wavelength may be 400 nm and 266 nm etc. The repetitive frequency is preferably large in consideration of processing time and reducing the arrangement pitch between concave portions or convex portions formed, and preferably 1,000 Hz or more. The pulse width of the laser is preferably short, and preferably about 200 femto-seconds ($10^{-15}$ seconds) to 1 pico-second ($10^{-12}$ seconds).

The laser main-body 340 emits laser beams linearly polarized in the vertical direction. Thus, in this apparatus, linearly polarized light in a desired direction or a circular polarized light is obtained by rotating the polarization direction by use of a wave plate 341 (for example, $\lambda/2$ wave plate). Furthermore, in this apparatus, a laser beam is partially taken out by use of an aperture 342 having a square opening, for the reason that since the intensity distribution of laser beam follows the Gaussian distribution, if the center portion of the laser beams alone is used, a laser beam having a uniform in-plane intensity distribution is obtained. Moreover, in the apparatus, the laser beam is narrowed by use of two cylindrical lenses 343 mutually perpendicularly placed to obtain a desired beam size. In processing the plate-form matrix 331, a linear stage 344 is moved at the same speed.

The beam spot of the laser with which the plate-form matrix 331 is irradiated preferably has a square shape. The beam spot can be shaped, for example, by use of an aperture and a cylindrical lens etc. Furthermore, the intensity distribution of the beam spot is preferably as uniform as possible. This is because the in-plane distribution of the depth of convexoconcave portions to be formed in dies is obtained as uniform as possible. Generally, since the size of a beam spot is smaller than the area to be processed, it is necessary to scan the beam to form convexoconcave portions in the entire surface that is desired to be processed.

The matrix (die) for use in forming the surface of the hydrophilic resin layer is formed by irradiating a substrate made of a metal such as SUS, NiP, Cu, Al and Fe with an ultrashort pulsed-laser beam having a pulse width of 1 pico-second ($10^{-12}$ seconds) or less called a femto second laser to draw a pattern. Polarization of a laser beam may be linear, circular or ellipsoidal. At this time, the laser wavelength, repetitive frequency, pulse width, beam-spot shape, polarization, the intensity of a laser with which a sample is irradiated and laser scanning speed, etc., are appropriately set. In this manner, a pattern having desired convexoconcave portions can be formed.

As the parameters that can be changed in order to obtain a desired shape, the following ones are mentioned. Fluence refers to the energy density (J/cm$^2$) per pulse and can be obtained in accordance with the following expression:

$$F=P/(fREPT \times S)$$

where
S=Lx×Ly
F: Fluence
P: Power of laser
fREPT: Repetitive frequency of laser
S: Area of laser at irradiation position
Lx×Ly: Beam size Note that the pulse number N is the number of pulses with which a single site is irradiated and obtained in accordance with the following expression.

$$N=fREPT \times Ly/v$$

where
Ly: Beam size of a laser in a scanning direction
v: Scanning speed of laser To obtain a desired shape, the material of the plate-form matrix 331 may be changed. Depending upon the material for the plate-form matrix 331, the shape processed by a laser changes. Other than the use of a metal such as SUS, NiP, Cu, Al and Fe, a matrix surface may be coated with, for example, a semiconductor material such as DLC (diamond-like carbon). As a method for coating a matrix surface with the semiconductor material, for example, plasma CVD and sputtering are mentioned. As the semiconductor material to be applied, not only DLC but also fluorine (F) containing DLC, titanium nitride and chromium nitride, etc., can be used. The average thickness of the coating film to be obtained may be set, for example, at about 1 μm.

[Laser Processing Step]

Figure 9A:
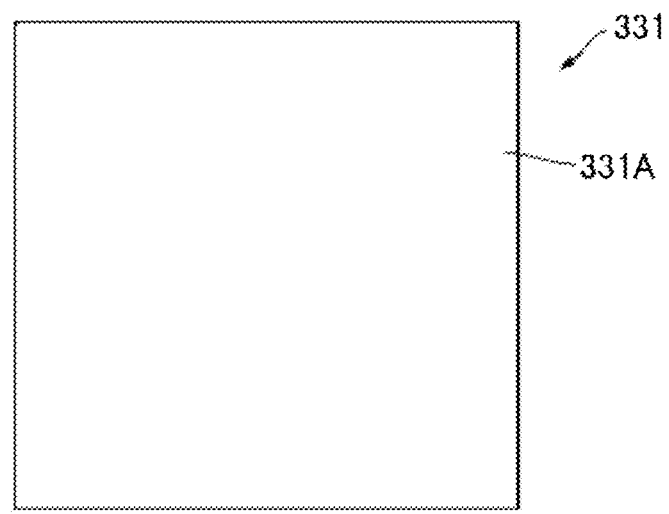
FIG. 9A is a process drawing for describing an example of a process for preparing a sheet-like matrix.

First, as shown in FIG. 9A, the plate-form matrix 331 is prepared. A surface 331A of the plate-form matrix 331 to be processed is, for example, in mirror surface state. Note that the surface 331A may not be in a mirror surface state or may have smaller convexoconcave portions than those in the pattern to be transferred or may have convexoconcave portions which are the same as or coarser than those in the pattern to be transferred.

Figure 9B:
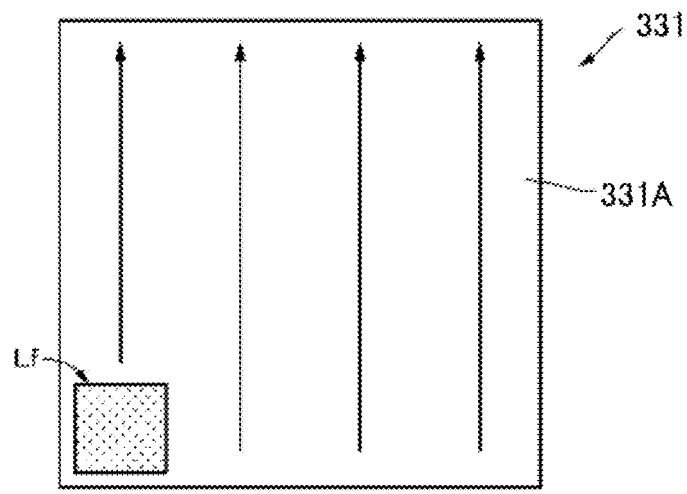
FIG. 9B is a process drawing for describing an example of a process for preparing a sheet-like matrix.

Next, using the laser processing apparatus shown in FIG. 8, the surface 331A of the plate-form matrix 331 is processed by a laser as follows. First, to the surface 331A of the plate-form matrix 331, an ultrashort pulsed-laser beam having a pulse width of 1 pico-second ($10^{-12}$ seconds) or less and called a femto second laser is applied to draw a pattern. For example, as shown in FIG. 9B, the surface 331A of the plate-form matrix 331 is irradiated with femto second laser light Lf and the irradiation spot is moved in a scanning manner.

Figure 9C:
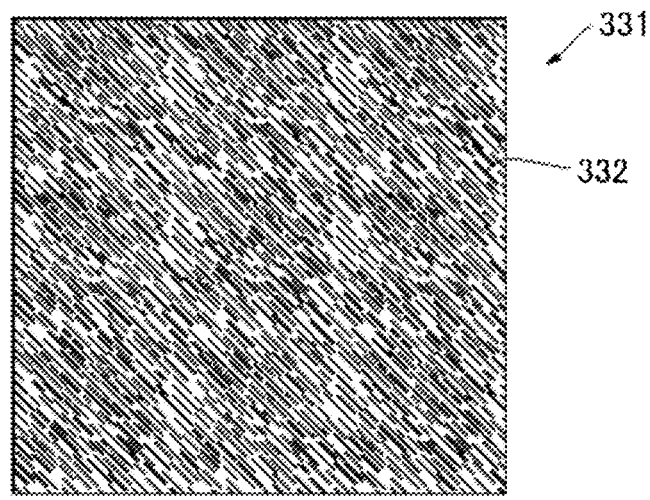
FIG. 9C is a process drawing for describing an example of a process for preparing a sheet-like matrix.

At this time, the laser wavelength, repetitive frequency, pulse width, beam-spot shape, polarization, the intensity of the laser with which the surface 331A is irradiated and laser scanning speed, etc., are appropriately set. In this manner, a plurality of structures 332 having a desired shape are formed, as shown in FIG. 9C.

[Transfer Process]

Figure 10A:
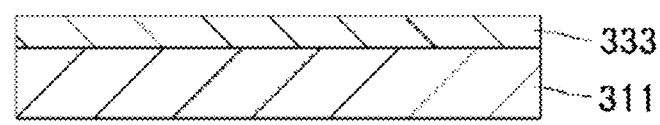
FIG. 10A is a process drawing for describing an example of a process for transferring micro convex portions or concave portions by a sheet-like matrix.

A substrate 311 made of a resin having an uncured resin layer 333 formed thereon is prepared as shown in the sectional view of FIG. 10A.

Figure 10B:
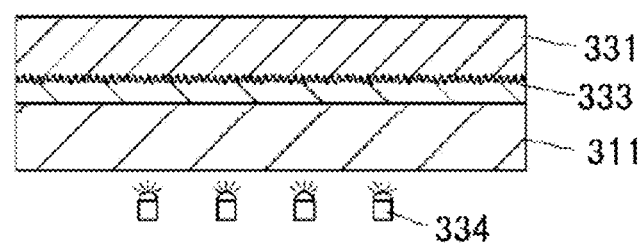
FIG. 10B is a process drawing for describing an example of a process for transferring micro convex portions or concave portions by a sheet-like matrix.

Next, as shown in the sectional view of FIG. 10B, the plate-form matrix 331 is brought into contact with the uncured resin layer 333 formed on the substrate 311 made of a resin. The uncured resin layer 333 is irradiated with an active energy ray 334 to cure the uncured resin layer 333. In this manner, micro convex portions or micro concave portions of the plate-form matrix 331 is transferred to obtain a hydrophilic resin layer 312 having micro convex portions or micro concave portions formed therein.

Figure 10C:
FIG. 10C is a process drawing for describing an example of a process for transferring micro convex portions or concave portions by a sheet-like matrix.

Finally, the hydrophilic resin layer 312 thus formed is removed from the plate-form matrix 331 to obtain a hydrophilic laminate (FIG. 10C).

Note that if a substrate 311 made of a resin is formed of a material which does not transmit an active energy ray such as ultraviolet rays, it is possible that the plate-form matrix 331 is formed of a material (for example, quartz), which can transmit an active energy ray, and the uncured resin layer 333 is irradiated with the active energy ray from the rear surface of the plate-form matrix 331 (the opposite surface to a molding surface).

(Antifouling Laminate)

The antifouling laminate of the present invention at least has the hydrophilic laminate of the present invention and further has other members as necessary.

The antifouling laminate may be the hydrophilic laminate by itself.

The antifouling laminate can prevent hydrophilic dirt by the hydrophilicity of the hydrophilic laminate.

(Product)

The product of the present invention has the hydrophilic laminate of the present invention as a surface and further has other members as necessary.

Examples of the product, which is not particularly limited and can be appropriately selected depending upon the purpose, include glass windows, refrigerating/freezing show case, window materials for automobile windows, bath mirrors, mirrors such as automobile side mirrors, floors and walls of bath rooms, solar battery panels and security/surveillance cameras.

The product may be a pair of glasses, goggles, head-gears, lenses, microlens arrays, and headlight covers, front panels, side panels and rear panels of automobiles. These are preferably formed by in-mold forming and insert molding.

The hydrophilic laminate may be used as a part or whole of the surface of the product.

A method for manufacturing the product is not particularly limited and can be appropriately selected depending upon the purpose; however, the method for manufacturing the product of the present invention (described later) is preferable.

(Method for Manufacturing the Product)

The method for manufacturing the product of the present invention at least has a heating step, a hydrophilic laminate molding step and an injection molding step, and further has other steps as necessary.

The method for manufacturing the product is the method for manufacturing the product of the present invention.

<Heating Step>

The heating step is not particularly limited and can be appropriately selected depending upon the purpose as long as it is a step of heating a hydrophilic laminate.

The hydrophilic laminate is the hydrophilic laminate of the present invention.

The heating is not particularly limited and can be appropriately selected depending upon the purpose; however, infrared heating is preferable.

The heating temperature is not particularly limited and can be appropriately selected depending upon the purpose; however, the heating temperature is preferably near the glass transition temperature of the substrate made of a resin or the glass transition temperature or more.

The heating time is not particularly limited and can be appropriately selected depending upon the purpose.

<Hydrophilic Laminate Molding Step>

The hydrophilic laminate molding step is not particularly limited and can be appropriately selected depending upon the purpose as long as it is a step of molding the heated hydrophilic laminate into a desired shape. For example, a step of bringing the laminate into contact with a predetermined die and molding the laminate into a desired shape by application of air pressure, is mentioned.

<Injection Molding Step>

The injection molding step is not particularly limited and can be appropriately selected depending upon the purpose as long as it is a step of injecting a molding material onto a substrate made of a resin of the hydrophilic laminate molded into a desired shape and molding the molding material.

As the molding material, for example, a resin is mentioned. Examples of the resin include olefin resins, styrene resins, ABS resins (acrylonitrile-butadiene-styrene copolymers), AS resins (acrylonitrile-styrene copolymers), acrylic resins, urethane resins, unsaturated polyester resins, epoxy resins, polyphenylene oxide/polystyrene resins, polycarbonates, polycarbonate modified polyphenylene ethers, polyethylene terephthalates, polysulfones, polyphenylene sulfides, polyphenylene oxides, polyetherimides, polyimides, liquid crystal polyesters, polyallyl heat-resistant resins, various types of complex resins and various types of modified resins.

The injection method is not particularly limited and can be appropriately selected depending upon the purpose. For example, a method of injecting a molten molding material to a substrate made of a resin of the hydrophilic laminate which is brought into contact with a predetermined die, is mentioned.

The method for manufacturing the product is preferably performed by use of an in-mold forming apparatus, an insert-molding apparatus or an overlay molding apparatus.

Herein, an example of the method for manufacturing the product of the present invention will be described with reference to the accompanying drawings. The manufacturing method is a manufacturing method using an in-mold forming apparatus.

First, a hydrophilic laminate 500 is heated. The heating is preferably performed by infrared heating.

Figure 11A:
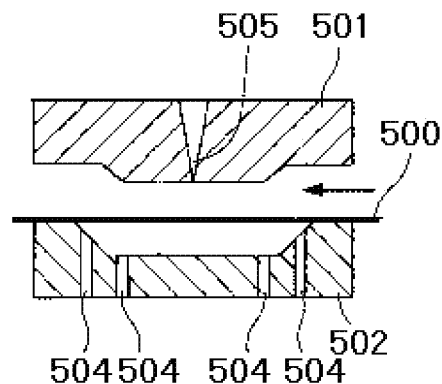
FIG. 11A is a process drawing for describing an example of manufacturing a product of the present invention by in-mold molding.

Then, as shown in FIG. 11A, the hydrophilic laminate 500 heated is disposed at a predetermined position between a first die 501 and a second die 502 in such a manner that the substrate made of a resin of the hydrophilic laminate 500 faces the first die 501; whereas the hydrophilic resin layer faces the second die 502. In FIG. 11A, the first die 501 is immovable; whereas the second die 502 is movable.

Figure 11B:
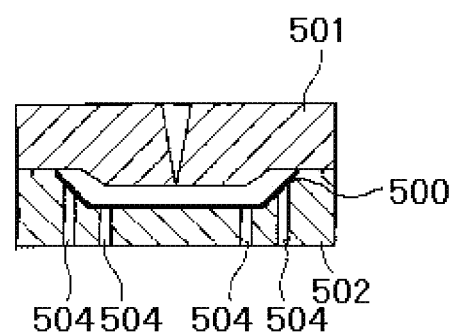
FIG. 11B is a process drawing for describing an example of manufacturing a product of the present invention by in-mold molding.

After the hydrophilic laminate 500 is disposed between the first die 501 and the second die 502, the first die 501 and the second die 502 are clamped. Subsequently, air is suctioned through a suction hole 504 having an opening in the cavity surface of the second die 502 to fit the hydrophilic laminate 500 along the cavity surface of the second die 502. In this manner, the cavity surface is shaped by the hydrophilic laminate 500. At this time, the periphery of the hydrophilic laminate 500 may be immobilized by a film fixation mechanism (not shown) to set the hydrophilic laminate. Thereafter, unnecessary portion of the hydrophilic laminate 500 is trimmed away (FIG. 11B).

Note that if the second die 502 has no suction hole 504 and the first die 501 has a hole (not shown), pressurized air is fed through the hole of the first die 501 toward the hydrophilic laminate 500 to fit the hydrophilic laminate 500 along the cavity surface of the second die 502.

Figure 11C:
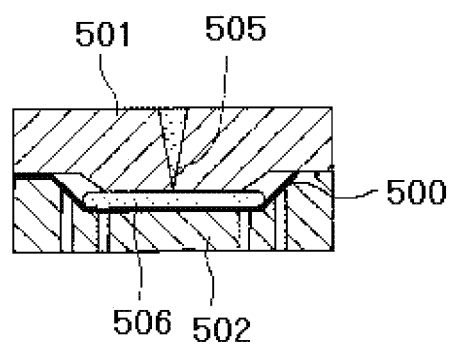
FIG. 11C is a process drawing for describing an example of manufacturing a product of the present invention by in-mold molding.
Figure 11D:
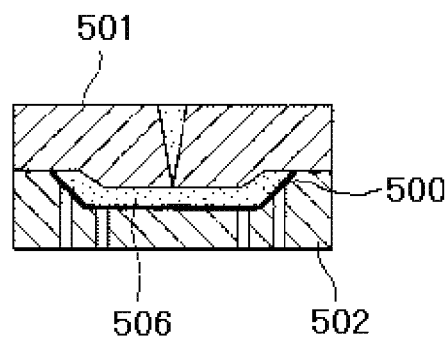
FIG. 11D is a process drawing for describing an example of manufacturing a product of the present invention by in-mold molding.

Subsequently, to the substrate made of a resin of the hydrophilic laminate 500, a molten molding material 506 is injected through a gate 505 of the first die 501 and poured in the cavity, which is formed of the first die 501 and the second die 502 by clamping (FIG. 11C). In this manner, the cavity is charged with the molten molding material 506 (FIG. 11D). After completion of charge with the molten molding material 506, the molten molding material 506 is cooled to a predetermined temperature and solidified.

Figure 11E:
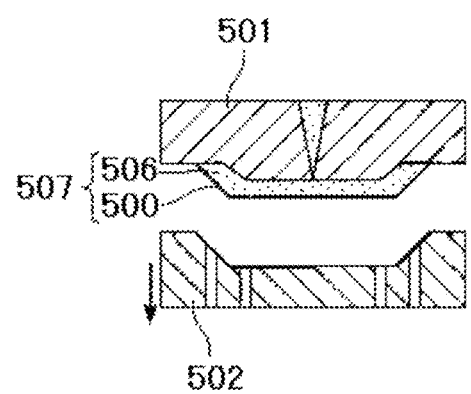
FIG. 11E is a process drawing for describing an example of manufacturing a product of the present invention by in-mold molding.
Figure 11F:
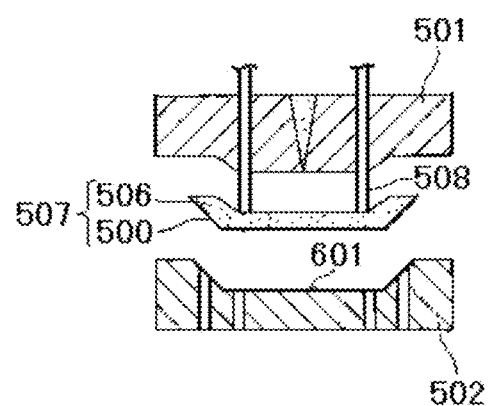
FIG. 11F is a process drawing for describing an example of manufacturing a product of the present invention by in-mold molding.

Thereafter, the second die 502 is moved to separate the first die 501 and the second die 502 (FIG. 11E). In this manner, the hydrophilic laminate 500 is attached to the surface of the molding material 506 and a product 507 molded into a desired shape by in-mold forming can be obtained.

Finally, ejection pins 508 are pressed to remove the obtained product 507 from the first die 501.

The manufacturing method using an overlay molding apparatus is as follows. This is a process of directly decorating the surface of a molding material with a hydrophilic laminate, and one example thereof is TOM (Three dimension Overlay Method). Next, one example of the method for manufacturing the product of the present invention using the TOM will be described.

First, both spaces of an apparatus that is partitioned by a hydrophilic laminate fixed in a fixing frame are vacuumed by sucking the air in the spaces with, for example, a vacuum pump. At this time, a molding material previously subjected to injection molding is placed in one of the spaces. At the same time, the hydrophilic laminate is heated with an infrared heater until the temperature reaches a predetermined temperature at which the hydrophilic laminate softens. At the timing when the hydrophilic laminate has been heated and softened, the hydrophilic laminate is allowed to firmly adhere to the three dimensional shape of the molding material under vacuum by feeding air to the space of the apparatus where the molding material is absent. If necessary, pressing with compressed air may further be employed in combination by feeding the compressed air to the space to which the air has been fed. After the hydrophilic laminate has adhered to the mold, the resultant decorated molded product is removed from the fixing frame. This vacuum molding is generally carried out at 80° C. to 200° C., preferably about 110° C. to about 160° C.

Upon overlay molding, in order to achieve adhesion between the hydrophilic laminate and the molding material, an adhesive layer may be provided on the surface of the hydrophilic laminate opposite to the hydrophilic surface thereof. The adhesive layer is not particularly limited and can be appropriately selected depending upon the purpose. Examples of the adhesive layer include acrylic adhesives and hot-melt adhesives. The method for forming the adhesive layer is not particularly limited and can be appropriately selected depending upon the purpose. In one exemplary method for forming the adhesive layer, after the hydrophilic resin layer has been formed on the substrate made of a resin, a coating liquid for forming an adhesive layer is coated on the surface of the substrate made of a resin opposite to the surface thereof that has been provided with the hydrophilic resin layer, to thereby form the adhesive layer. In another employable method, a coating liquid for forming an adhesive layer is coated on a release sheet to form the adhesive layer, and then the substrate made of a resin and the adhesive layer on the release sheet are laminated on top of each other, to thereby laminate the adhesive layer on the substrate made of a resin.

(Antifouling Method)

The antifouling method of the present invention is a method for protecting the product from dirt by laminating the hydrophilic laminate of the present invention onto the surface of a product.

Examples of the product, which is not particularly limited and can be appropriately selected depending upon the purpose, include glass windows, refrigerating/freezing show case, window materials for automobile windows, bath mirrors, mirrors such as automobile side mirrors, floors and walls of bath rooms, solar battery panels and security/surveillance cameras.

The product may be a pair of glasses, goggles, head-gears, lenses, microlens arrays, and headlight covers, front panels, side panels and rear panels of automobiles. These are preferably formed by in-mold forming and insert molding.

The method for laminating the hydrophilic laminate onto the surface of a product is not particularly limited and can be appropriately selected depending upon the purpose. For example, a method for attaching the hydrophilic laminate to a surface of the product is mentioned. The hydrophilic laminate can be laminated onto a surface of the product also by the method for manufacturing the product of the present invention.

EXAMPLES

Now, Examples of the present invention will be described; however the present invention is not limited to these Examples.

<Average Distance Between Convex Portions, Average Distance Between Concave Portions, Average Height of Convex Portions, Average Depth of Concave Portions, Average Aspect Ratio and Average Surface Area Ratio>

In the following Examples, the average distance between convex portions, average distance between concave portions, average height of convex portions, average depth of concave portions, and average aspect ratio were obtained as follows.

First, the surface of a hydrophilic resin layer having convex portions or concave portions was observed by an atomic force microscope (AFM). From the section profile by the AFM, the pitch of convex portions or concave portions, the height of the convex portions or the depth of the concave portions were obtained. This procedure was repeated with respect to 10 sites randomly selected from the surface of the hydrophilic resin layer to obtain pitch P1, P2, . . . , P10 and the height or depth H1, H2, . . . , H10.

The pitch of the convex portions herein is the distance between the peaks of convex portions. The pitch of the concave portion is the distance between the deepest portions of concave portions. The height of the convex portion is the height of the convex portion based on the lowest point of the valley portion between the convex portions. The depth of the concave portion is the depth of the concave portion based on the highest point of the mount portion between the concave portions.

Then, these pitches P1, P2, . . . , P10, and height or depth H1, H2, . . . , H10 were simply averaged (arithmetic average), respectively, to obtain the average distance (Pm) of convex portions or concave portions, average height of convex portions or the average depth (Hm) of the concave portions.

Based on the value Pm and the value Hm, the average aspect ratio (Hm/Pm) was obtained.

With respect to 10 sites randomly selected from the surface of a hydrophilic resin layer having convex portions or concave portions, an AFM image was repeatedly taken to obtain surface areas S1, S2, ..., S10. Next, the ratios of these surface areas S1, S2, ..., S10 to the areas of the corresponding observation areas (surface area/area) SR1, SR2, ..., SR10 were simply averaged (arithmetic average) to obtain average surface area ratio SRm of the surface of a hydrophilic resin layer.

<Pure Water Contact Angle>

The pure water contact angle was measured by a slide drop method by use of PCA-1 (manufactured by Kyowa Interface Science Co., Ltd.) in the following conditions.

Distillation water was placed in a plastic syringe. To the tip of the syringe, a stainless steel needle was attached. The distillation water was allowed to drip on an evaluation surface.

The amount of water to be dripped: 2 µL
The measurement temperature: 25° C.

<Martens Hardness>

The Martens hardness of the hydrophilic resin layer was measured by use of, PICODENTOR HM500 (trade name; Fischer Instruments K.K.). Measurement was performed by applying a load (1 mN/20 s) and using a diamond cone as a needle and at a face angle of 136°.

<Pencil Hardness>

The pencil hardness of the hydrophilic resin layer was measured in accordance with JIS K 5600-5-4.

<Elongation Percentage>

The elongation percentage was obtained by the following method.

The hydrophilic laminate was cut into rectangular pieces of 10.5 cm in length×2.5 cm in width and used as measurement samples. The tension-elongation percentage of the measurement samples obtained was determined by a tension-tester (autograph AG-5kNX plus, manufactured by Shimadzu Corporation) in measurement conditions: (tension rate=100 mm/min; distance between chucks=8 cm, measurement temperature=190° C.).

<Entire Light Beam Transmissivity>

The entire light beam transmissivity of the hydrophilic laminate was evaluated in accordance with JIS K 7361 and by use of HM-150 (trade name; manufactured by MURAKAMI COLOR RESEARCH LABORATORY Co., Ltd).

<Haze>

The haze of the hydrophilic laminate was evaluated in accordance with JIS K 7136 and by use of HM-150 (trade name; manufactured by MURAKAMI COLOR RESEARCH LABORATORY Co., Ltd).

<Adhesion>

The adhesion of the hydrophilic resin layer was evaluated by a grid (1 mm interval×100 cells) cellophane tape (CT24, manufactured by NICHIBAN Co., Ltd.) peel test in accordance with JIS K 5400.

<Difference in Heat Shrinkage Rate>

Difference in heat shrinkage rate of the hydrophilic laminate was obtained by the following method.

First, square test pieces having a size of 100 mm×100 mm were cut out such that the longitudinal direction and transverse direction of the test pieces match the longitudinal direction and width direction of the substrate made of a resin, respectively. Subsequently, these test pieces were heated in an oven at 190° C. for 30 minutes, taken out from the oven and naturally cooled to room temperature. Thereafter, the length of the test pieces in the longitudinal direction and transverse direction were measured by a ruler. Change rates of the lengths of both directions were calculated respectively based on the length (=100 mm) of a test piece before heating and an absolute value of the difference between the change rates was obtained. This procedure was repeated with respect to test pieces (N=10) and the average value of them was regarded as the difference in heat shrinkage rate of the hydrophilic laminate.

Example 1

Preparation of Transfer Matrix (Glass Roll Matrix) Having Either One of Micro Convex Portions and Concave Portions Firstly, a glass roll matrix having an outer diameter of 126 mm was prepared, and a resist layer was formed on the surface of the glass roll matrix in the following manner. Namely, a photoresist was diluted 1/10 by mass ratio with a thinner, and the diluted resist was applied to the cylindrical surface of the glass roll matrix in an average thickness of about 70 nm by a dipping method to form a resist layer. Next, the glass roll matrix was conveyed to an exposure apparatus for a roll matrix shown in FIG. 4, the resist layer was exposed, and thereby latent images lying in a spiral manner and forming a hexagonal lattice pattern between adjacent three rows of tracks was patterned on the resist layer. Specifically, an exposure pattern having a hexagonal lattice shape was formed by applying a 0.50 mW/m laser beam to a region where the exposure pattern having a hexagonal lattice shape to be formed.

Next, development processing was applied to the resist layer on the glass roll matrix, and the development was carried out by dissolving the resist layer of the exposed part. Specifically, the undeveloped glass roll matrix was mounted on a turntable of the developing apparatus not shown in the figure, developing solution was dropped on the surface of the glass roll matrix while the glass roll matrix was rotated with the turntable, and the resist layer on the surface of the glass roll matrix was developed. Thereby, a resist glass matrix in which the resist layer is open in a hexagonal lattice pattern was obtained.

Next, plasma etching was carried out under a $CHF_3$ gas atmosphere using a roll etching apparatus. Thereby, etching progressed at only the hexagonal lattice pattern part exposed from the resist layer on the surface of the glass roll matrix, and the other regions were not etched because the resist layer worked as a mask, and concave portions having an elliptic cone shape were formed on the glass roll matrix. In the etching, the amount of etching (depth) was adjusted by the etching time. Finally, a glass roll matrix having a concave shaped hexagonal lattice pattern was obtained by removing the resist layer completely by $O_2$ ashing.

<Preparation of Hydrophilic Laminate>

Next, a hydrophilic laminate was prepared using the roll matrix obtained in the manner described above by a UV imprint. Specifically, the preparation was carried out in the following manner.

As a substrate made of a resin, DF02U (PMMA/PC lamination) (average thickness 125 µm) manufactured by Mitsubishi Gas Chemical Co., Inc. was used.

An ultraviolet curable resin composition for an anchor layer having the following formulation was applied to the PMMA surface of the substrate made of a resin so that the average thickness after drying and curing became 0.7 µm.

| Ultraviolet Curable Resin Composition for Anchor Layer | |
| --- | --- |
| CN985B88 (aliphatic urethane acrylate, manufactured by Sartomer) | 15 parts by mass |

-continued

| Ultraviolet Curable Resin Composition for Anchor Layer | |
|---|---|
| A-9300-1CL (isocyanuric acid-containing triacrylate) (manufactured by Shin-Nakamura Chemical Co., Ltd) | 15 parts by mass |
| Butyl acetate | 68.8 parts by mass |
| IRGACURE 184 (Ciba Specialty Chemicals Inc.) | 0.6 parts by mass |
| IRGACURE 907 (Ciba Specialty Chemicals Inc.) | 0.6 parts by mass |
| KP 323 (Shin-Etsu Chemical Co., Ltd.) | 0.003 parts by mass |

After drying, an ultraviolet ray having an irradiation amount of 1,000 mJ/cm$^2$ was irradiated to the uncured anchor layer using a mercury lamp to obtain an ultraviolet cured substrate made of a resin and having an anchor layer.

An ultraviolet curable resin composition for a hydrophilic resin layer having the following formulation was applied to the anchor layer of the substrate made of a resin and having an anchor layer so that the average thickness of the hydrophilic resin layer to be obtained became 1.6 μm. The substrate made of a resin and having an anchor layer to which substrate the ultraviolet curable resin composition for a hydrophilic resin layer was applied and the roll matrix obtained in the manner as described above were brought into contact, and the hydrophilic resin layer was cured by irradiating an ultraviolet ray from the side of the substrate made of a resin by an irradiation amount of 1,500 mJ/cm$^2$ using a metal halide lamp. Thereafter, the hydrophilic layer was peeled from the roll matrix.

| Ultraviolet Curable Resin Composition for Hydrophilic Resin Layer | |
|---|---|
| A-9300 (Ethoxylated isocyanuric acid triacrylate) (manufactured by Shin-Nakamura Chemical Co., Ltd) | 32 parts by mass |
| CN985B88 (aliphatic urethane acrylate, manufactured by Sartomer) | 32 parts by mass |
| MPEM-1000 (Methoxy polyethylene glycol 1000 methacrylate, manufactured by Dai-Ichi Kogyo Seiyaku Co., Ltd.) | 32 parts by mass |
| Lucirin TPO (manufactured by BASF) | 4 parts by mass |

Figure 12A:
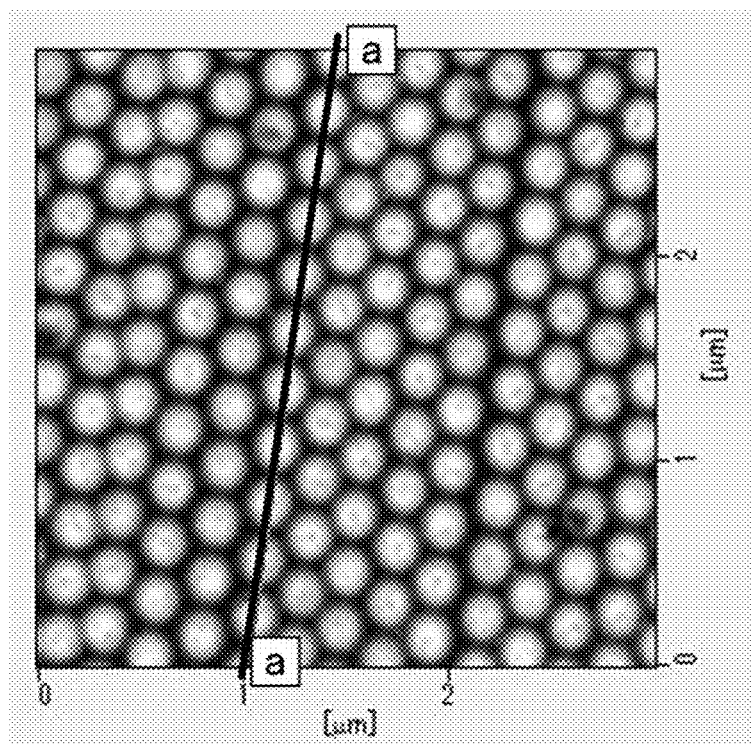
FIG. 12A is an AFM image of a surface of the hydrophilic resin layer of the hydrophilic laminate of Example 1.
Figure 12B:
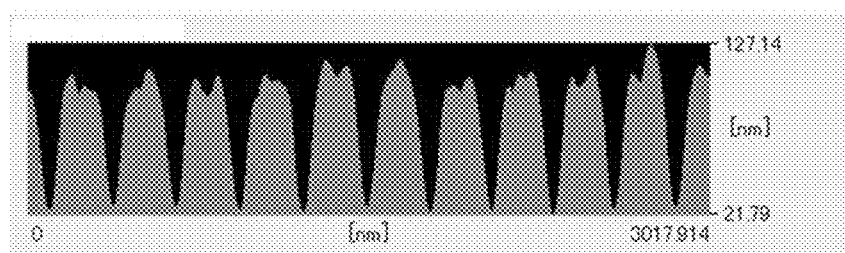
FIG. 12B is a cross sectional view along the a-a line in FIG. 12A.

A hydrophilic laminate having micro convex portions on the surface of a hydrophilic layer was obtained in the manner as described above. An AFM image of a surface of the hydrophilic resin layer of the obtained hydrophilic laminate is shown in FIG. 12A. A cross sectional view along the a-a line in FIG. 12A is shown in FIG. 12B.

The mean pitch of the convex portions (or the mean pitch of the concave portions) (Pm), the mean height of the convex portions (or the mean depth of the concave portions) (Hm), the mean aspect ratio (Hm/Pm), the mean surface area ratio (SRm), the pure water contact angle, the Martens hardness, the pencil hardness, the elongation percentage, the total light transmittance, the haze, the adhesiveness, and the heat contraction percentage difference of the obtained hydrophilic laminate were measured by the methods as described above. The results are shown in Table 2.

Moreover, the following evaluation was carried out. The results are shown in Table 3.
<Antifogging Property>
The surface of the hydrophilic resin layer of the hydrophilic laminate was strongly breathed once from a place 5 cm apart from the surface in the normal line direction of the surface under an environment of 20° C., and the antifogging property was evaluated according to the following criteria.

[Evaluation Criteria]
Good: There was no change in appearance of the hydrophilic laminate.
Poor: There was change in appearance of the hydrophilic laminate such as formation of a film of water and white cloud.
<Scratch Resistance>
A wiping cloth (savina MX manufactured by KB Seiren, Ltd.) was impregnated with pure water and placed on the surface of the hydrophilic resin layer, reciprocating sliding was repeated 1,000 times (sliding stroke: 3 cm, sliding frequency: 60 Hz) with a load of 75 gf/13 mm in diameter, and thereafter the scratch resistance was evaluated according to the following criteria.
[Evaluation Criteria]
Good: There was no change in appearance and antifogging property.
Fair: There was no change in appearance, but the antifogging property was deteriorated. Or the antifogging property was not deteriorated, but there was change in appearance such as a scratch and cloudiness.
Poor: There was change in appearance such as a scratch and cloudiness and the antifogging property was deteriorated.
<Interference Unevenness>
Firstly, the hydrophilic laminate was stuck on a black acrylic sheet (trade name: ACRYLITE manufactured by Mitsubishi Rayon Co., Ltd) using a double-sided adhesive sheet (trade name: LUCIACS CS9621T manufactured by Nitto Denko Corporation) so that the surface for evaluation (the surface of the hydrophilic resin layer) became topside. Next, the surface for evaluation was observed under a white fluorescent light, and the interference unevenness was evaluated according to the following criteria.
[Evaluation Criteria]
Good: The surface for evaluation was black, and the interference unevenness was not able to be confirmed.
Fair: The surface for evaluation was slightly colored, and the interference unevenness was slightly confirmed.
Poor: The surface for evaluation turned green or red, etc., and the interference unevenness was confirmed.
<Molding>
In-mold molding was carried out by the method shown in FIG. 11A to 11F, and the pure water contact angle, the antifogging property, and the Martens hardness of the hydrophilic resin layer after molding were evaluated by the above-described evaluation methods. Moreover, the appearance of the molded product was observed, and whether a scratch, a crack, or peeling was present or not was evaluated.
In addition, the heating (infrared heating) temperature in the heating process of heating the hydrophilic laminate was set to 190° C., and a polycarbonate was used as a molding material. In the in-mold molding, the elongation percentage at the most elongated part of the hydrophilic laminate was 40%. The pure water contact angle and the antifogging property were evaluated at the part where the hydrophilic laminate was elongated by 10%.

Example 2

Figure 13A:
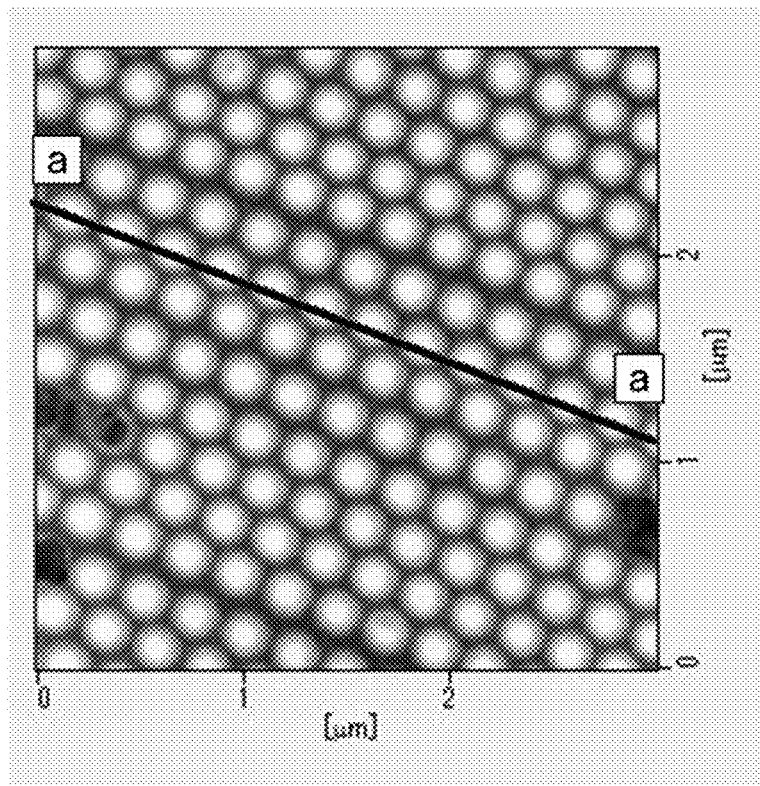
FIG. 13A is an AFM image of a surface of the hydrophilic resin layer of the hydrophilic laminate of Example 2.
Figure 13B:
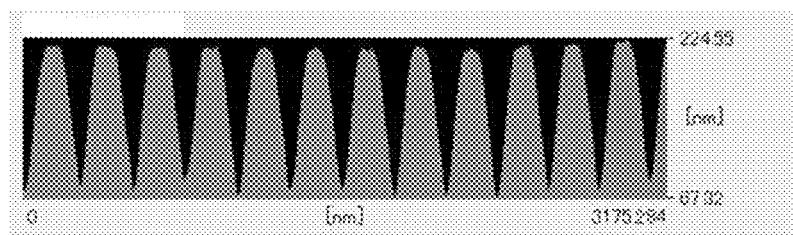
FIG. 13B is a cross sectional view along the a-a line in FIG. 13A.

A hydrophilic laminate was prepared in the same manner as in Example 1 except that the etching time in preparing the glass roll matrix in Example 1 was changed.
An AFM image of a surface of the hydrophilic resin layer of the obtained hydrophilic laminate is shown in FIG. 13A. A cross sectional view along the a-a line in FIG. 13A is shown in FIG. 13B.

The same evaluation as in Example 1 with regard to the prepared hydrophilic laminate was carried out. The results are shown in Table 2 and Table 3.

Example 3

A hydrophilic laminate was prepared in the same manner as in Example 2 except that the exposure pattern in preparing the glass roll matrix in Example 2 was reversed.

Figure 14A:
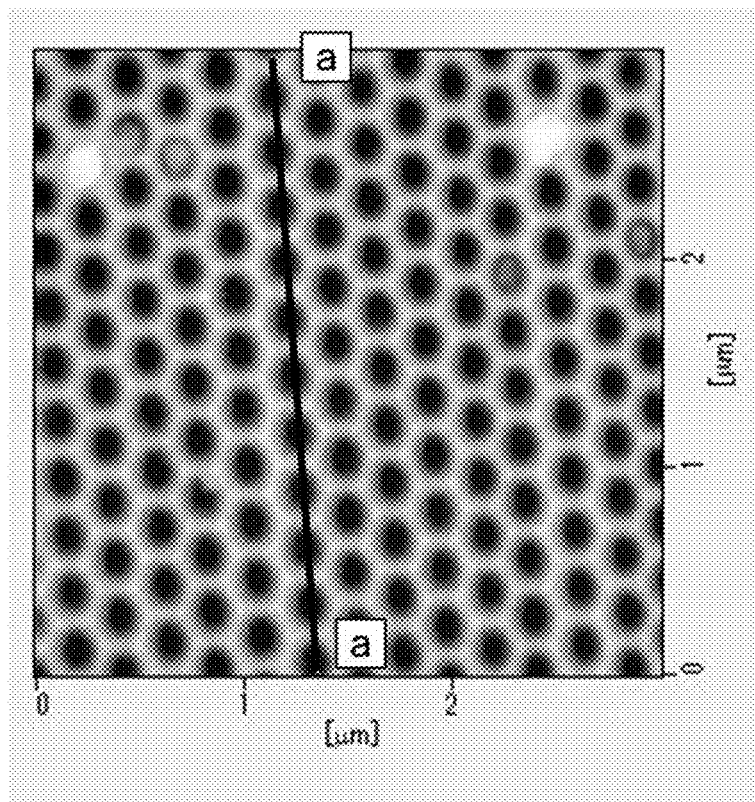
FIG. 14A is an AFM image of a surface of the hydrophilic resin layer of the hydrophilic laminate of Example 3.
Figure 14B:
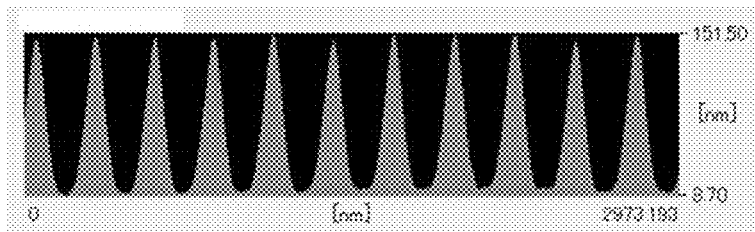
FIG. 14B is a cross sectional view along the a-a line in FIG. 14A.

An AFM image of a surface of the hydrophilic resin layer of the obtained hydrophilic laminate is shown in FIG. 14A. A cross sectional view along the a-a line in FIG. 14A is shown in FIG. 14B.

The same evaluation as in Example 1 with regard to the prepared hydrophilic laminate was carried out. The results are shown in Table 2 and Table 3.

Example 4

A hydrophilic laminate was prepared in the same manner as in Example 1 except that the etching time in preparing the glass roll matrix in Example 1 was changed.

Figure 15A:
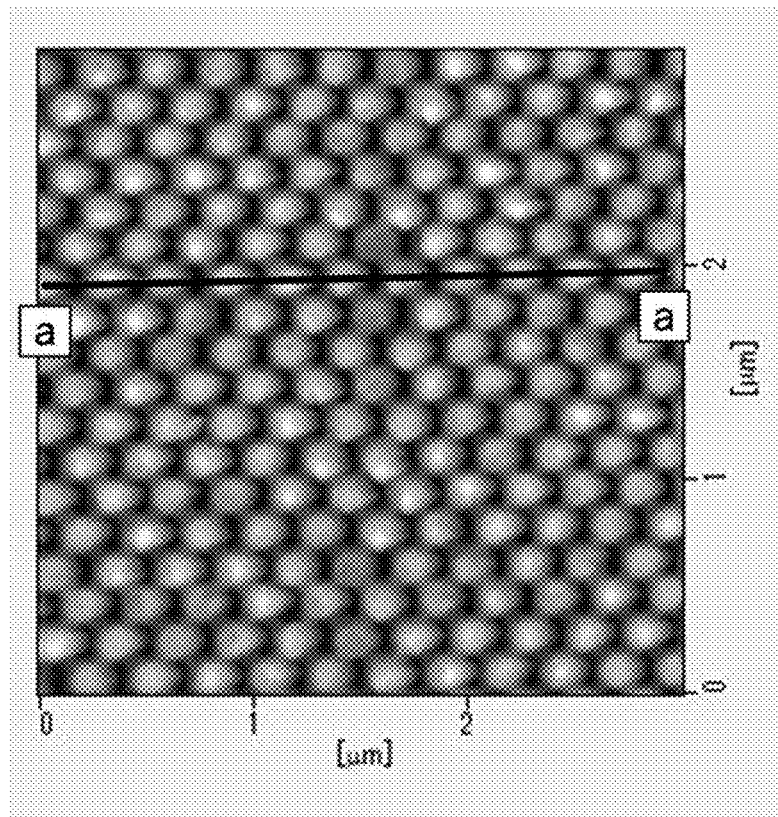
FIG. 15A is an AFM image of a surface of the hydrophilic resin layer of the hydrophilic laminate of Example 4.
Figure 15B:
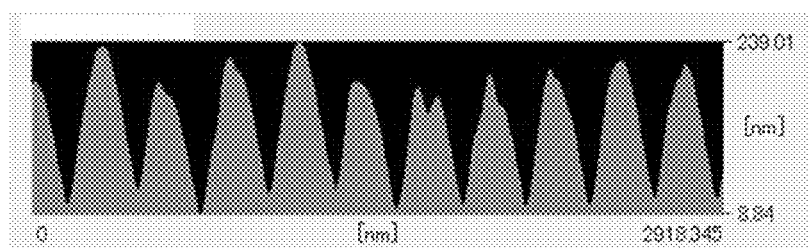
FIG. 15B is a cross sectional view along the a-a line in FIG. 15A.

An AFM image of a surface of the hydrophilic resin layer of the obtained hydrophilic laminate is shown in FIG. 15A. A cross sectional view along the a-a line in FIG. 15A is shown in FIG. 15B.

The same evaluation as in Example 1 with regard to the prepared hydrophilic laminate was carried out. The results are shown in Table 2 and Table 3.

Example 5

A hydrophilic laminate was prepared in the same manner as in Example 3 except that the etching time in preparing the glass roll matrix in Example 3 was changed.

Figure 16A:
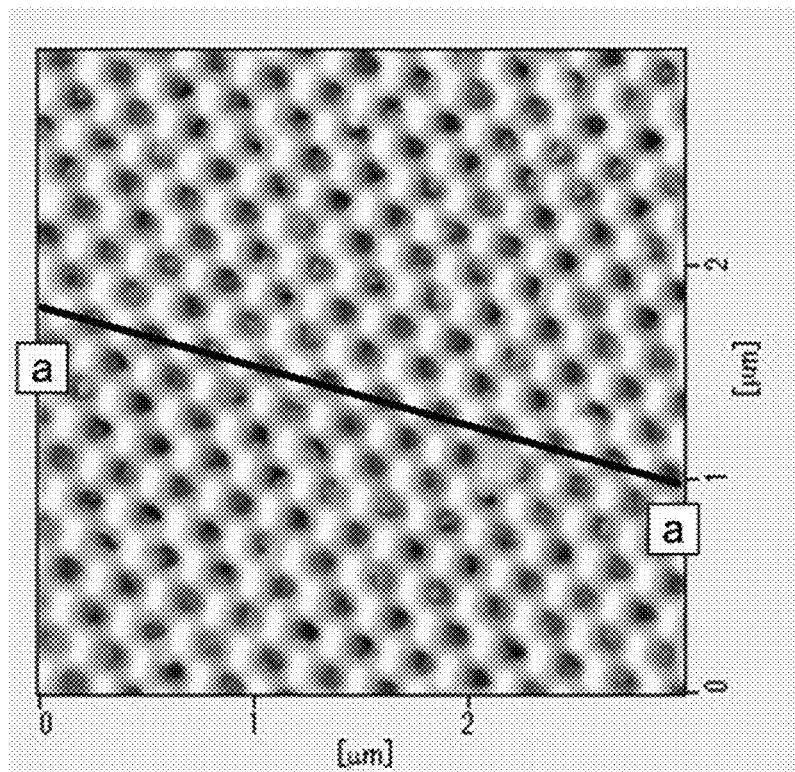
FIG. 16A is an AFM image of a surface of the hydrophilic resin layer of the hydrophilic laminate of Example 5.
Figure 16B:
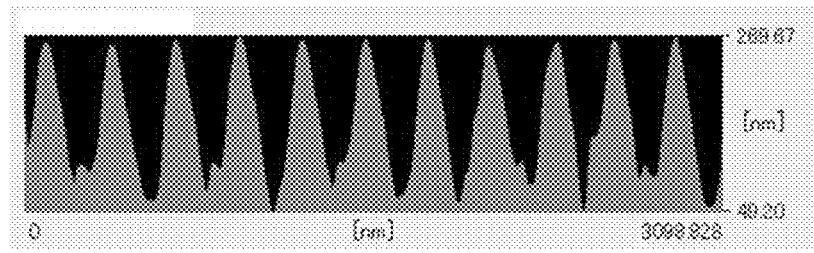
FIG. 16B is a cross sectional view along the a-a line in FIG. 16A.

An AFM image of a surface of the hydrophilic resin layer of the obtained hydrophilic laminate is shown in FIG. 16A. A cross sectional view along the a-a line in FIG. 16A is shown in FIG. 16B.

The same evaluation as in Example 1 with regard to the prepared hydrophilic laminate was carried out. The results are shown in Table 2 and Table 3.

Example 6

Preparation of Transfer Matrix (Sheet-Like Matrix) Having Either One of Micro Convex Portions and Concave Portions An apparatus shown in FIG. 8 was used as a laser processing apparatus. An IFRIT (trade name) manufactured by Cyber Laser Inc. was used as a laser main-body 340. The wavelength of the laser was set to 800 nm, the repetition frequency was set to 1,000 Hz, and the pulse width was set to 220 fs.

Firstly, a matrix was prepared by covering a surface of a sheet-like substrate (SUS) by DLC (Diamond-Like Carbon) by a spattering method. Next, micro concave portions were formed on the surface of the DLC film of the matrix using the laser processing apparatus. In forming the concave portions, laser processing was applied under the laser processing conditions shown in Table 1. A sheet-like matrix for shape transfer was obtained in the manner as described above. In addition, the size of the matrix was made to be a rectangular shape of 2 cm×2 cm.

TABLE 1

| | | | | | Laser processing conditions | | | | |
| | Matrix material | Wavelength (nm) | Polarization of light | P (mW) | Lx (μm) Width | Ly (μm) Length | v (mm/s) | N | F (J/cm$^2$) |
| --- | --- | --- | --- | --- | --- | --- | --- | --- | --- |
| Example 6 | DLC | 800 | Linear | 96 | 300 | 160 | 8 | 20 | 0.2 |
| Example 7 | DLC | 800 | Linear | 96 | 300 | 160 | 5.33 | 30 | 0.2 |
| Example 8 | DLC | 800 | Circular | 96 | 300 | 160 | 8 | 20 | 0.2 |
| Example 9 | DLC | 800 | Circular | 96 | 300 | 160 | 5.33 | 30 | 0.2 |

<Preparation of Hydrophilic Laminate>

Next, a hydrophilic laminate was prepared by UV imprint using the sheet-like matrix obtained in the manner described above. Specifically, the preparation was carried out in the following manner.

A hydrophilic laminate was prepared in the same manner as in Example 1 except that the roll matrix was changed to the sheet-like matrix obtained in the manner described above in the preparation of the hydrophilic laminate of Example 1.

Figure 17A:
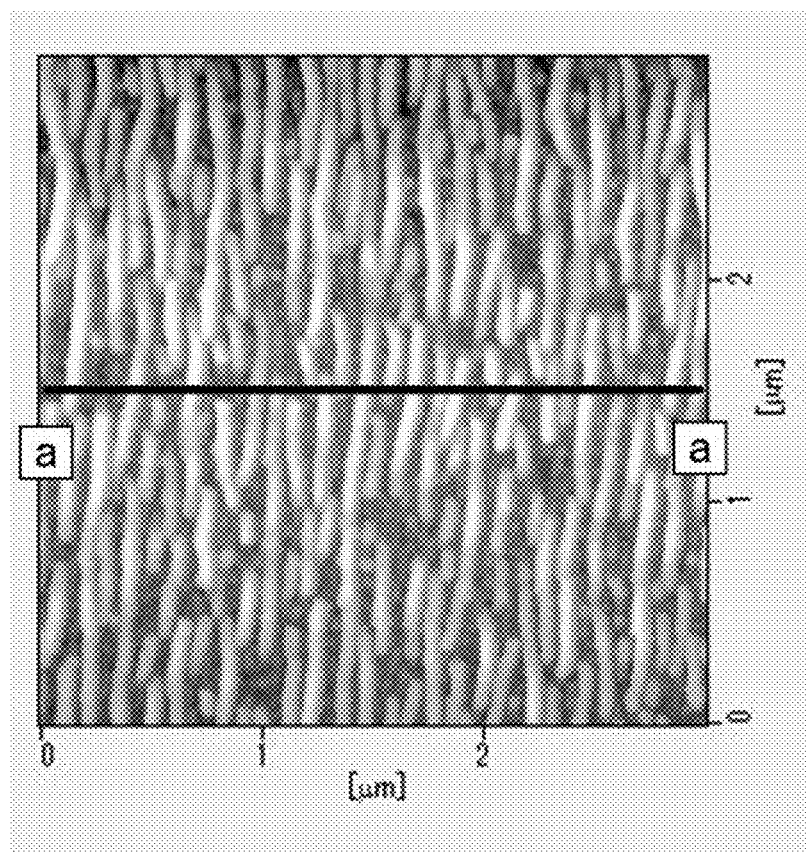
FIG. 17A is an AFM image of a surface of the hydrophilic resin layer of the hydrophilic laminate of Example 6.
Figure 17B:
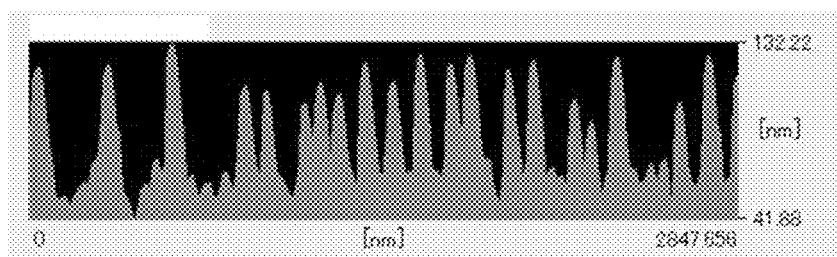
FIG. 17B is a cross sectional view along the a-a line in FIG. 17A.

An AFM image of a surface of the hydrophilic resin layer of the obtained hydrophilic laminate is shown in FIG. 17A. A cross sectional view along the a-a line in FIG. 17A is shown in FIG. 17B.

The same evaluation as in Example 1 with regard to the prepared hydrophilic laminate was carried out. The results are shown in Table 2 and Table 3.

Examples 7 to 9

Hydrophilic laminates were prepared in the same manner as in Example 6 except that the conditions in preparing the sheet-like matrix in Example 6 were changed to the conditions shown in Table 1.

Figure 18A:
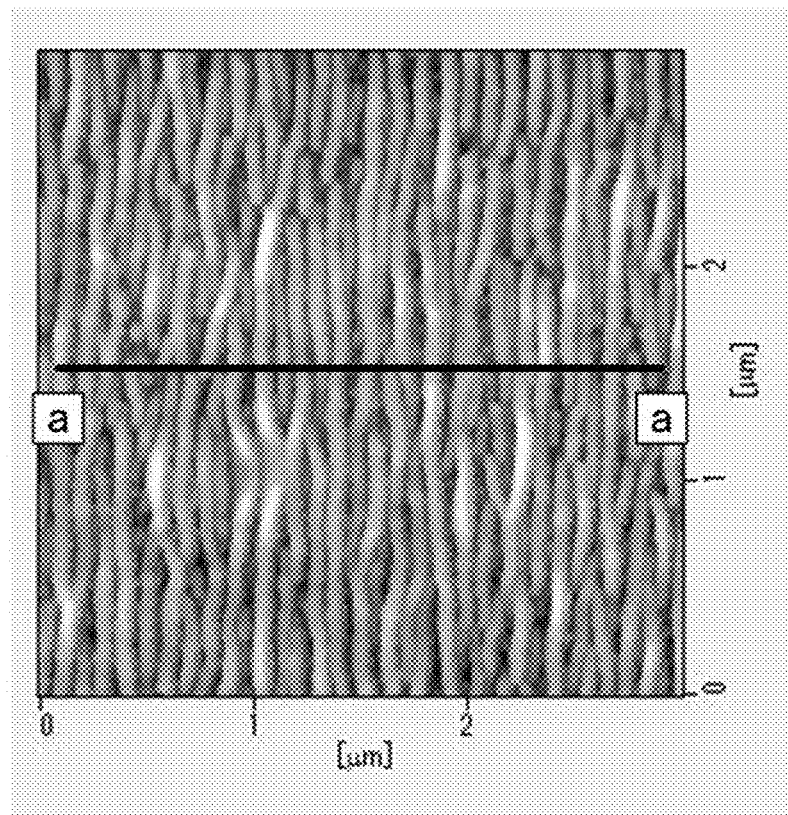
FIG. 18A is an AFM image of a surface of the hydrophilic resin layer of the hydrophilic laminate of Example 7.
Figure 18B:
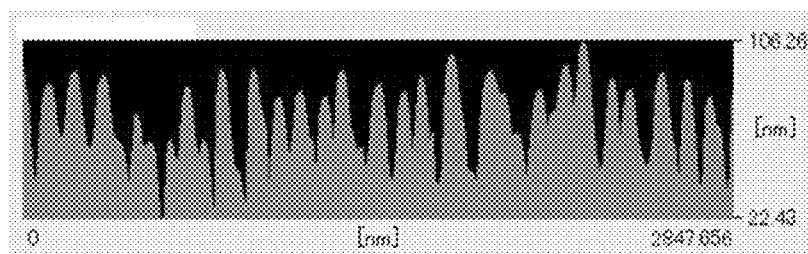
FIG. 18B is a cross sectional view along the a-a line in FIG. 18A.

An AFM image of a surface of the hydrophilic resin layer of the obtained hydrophilic laminate of Example 7 is shown in FIG. 18A. A cross sectional view along the a-a line in FIG. 18A is shown in FIG. 18B.

Figure 19A:
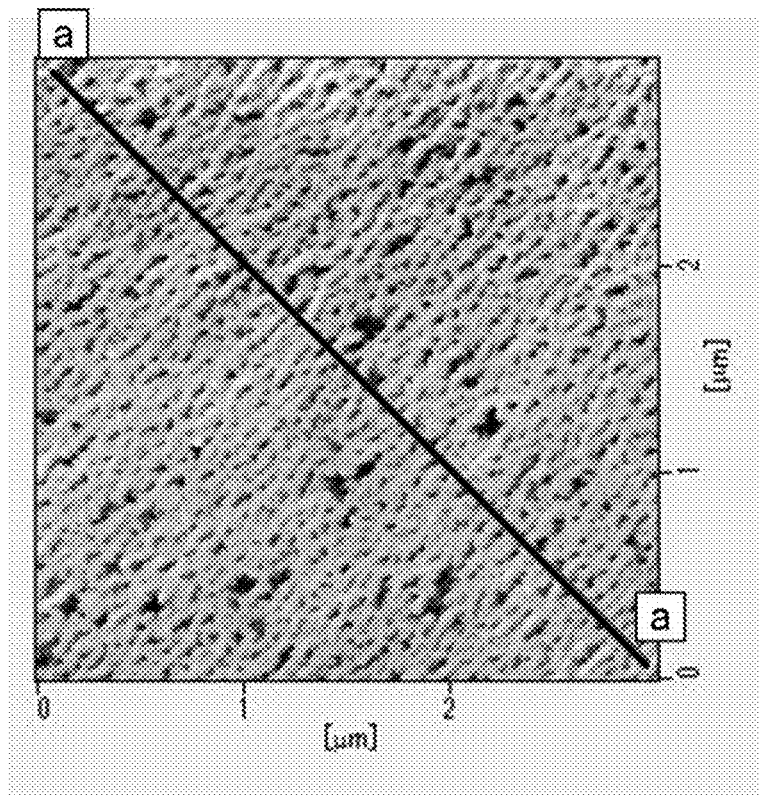
FIG. 19A is an AFM image of a surface of the hydrophilic resin layer of the hydrophilic laminate of Example 8.
Figure 19B:
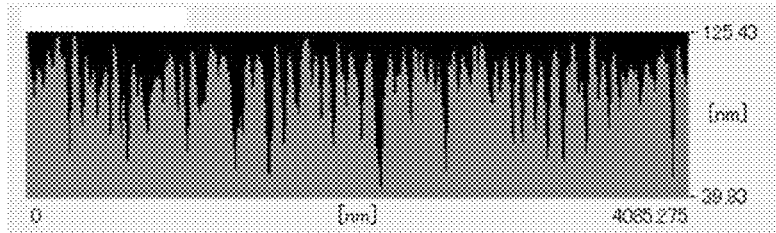
FIG. 19B is a cross sectional view along the a-a line in FIG. 19A.

An AFM image of a surface of the hydrophilic resin layer of the obtained hydrophilic laminate of Example 8 is shown in FIG. 19A. A cross sectional view along the a-a line in FIG. 19A is shown in FIG. 19B.

Figure 20A:
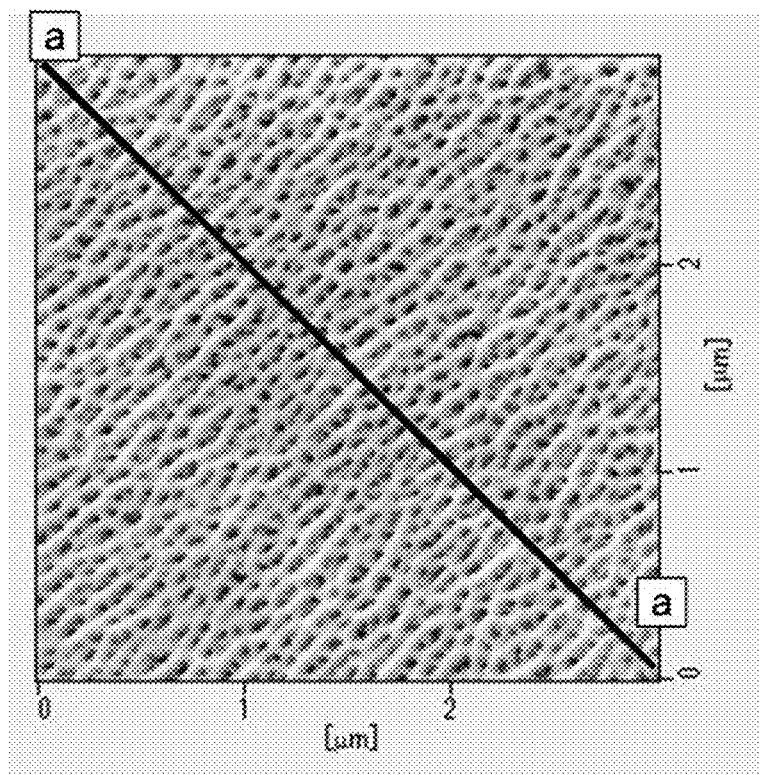
FIG. 20A is an AFM image of a surface of the hydrophilic resin layer of the hydrophilic laminate of Example 9.
Figure 20B:
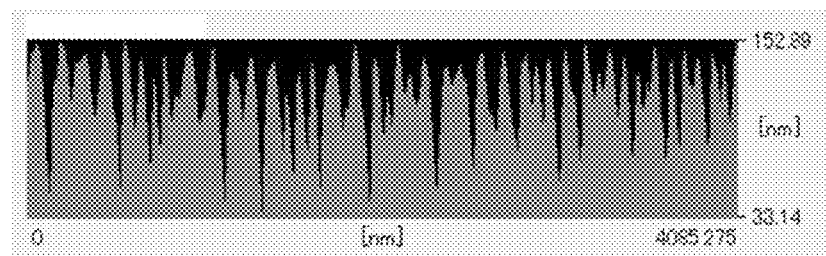
FIG. 20B is a cross sectional view along the a-a line in FIG. 20A.

An AFM image of a surface of the hydrophilic resin layer of the obtained hydrophilic laminate of Example 9 is shown in FIG. 20A. A cross sectional view along the a-a line in FIG. 20A is shown in FIG. 20B.

The same evaluation as in Example 1 with regard to the prepared hydrophilic laminates was carried out. The results are shown in Table 2 and Table 3.

Example 10

A hydrophilic laminate was prepared in the same manner as in Example 1 except that the formulations of the ultraviolet curable resin composition for an anchor layer and the ultraviolet curable resin composition for a hydrophilic resin layer were changed to the following formulations.

| Ultraviolet Curable Resin Composition for Anchor Layer | |
|---|---|
| 8BR-500 (Urethane acrylate polymer, manufactured by TAISEI FINE CHEMICAL CO,. LTD.) | 45 parts by mass |
| UV-7550 (urethane acrylate, manufactured by The Nippon Synthetic Chemical Industry Co., Ltd.) | 15 parts by mass |
| Butyl acetate | 38.8 parts by mass |
| IRGACURE 184 (Ciba Specialty Chemicals Inc.) | 0.6 parts by mass |
| IRGACURE 907 (Ciba Specialty Chemicals Inc.) | 0.6 parts by mass |
| KP323 (Shin-Etsu Chemical Co., Ltd.) | 0.003 parts by mass |

| Ultraviolet Curable Resin Composition for Hydrophilic Resin Layer | |
|---|---|
| A-600 (Polyethylene glycol diacrylate, manufactured by SHIN-NAKAMURA CHEMICAL CO., LTD.) | 43 parts by mass |
| M-215 (isocyanuric acid diacrylate, manufactured by TOAGOSEI CO., LTD.) | 43 parts by mass |
| LIGHT ESTER THF (1000) (THF modified methacrylate, manufactured by KYOEISHA CHEMICAL Co., LTD.) | 10 parts by mass |
| Lucirin TPO (manufactured by BASF) | 4 parts by mass |

Finally, an adhesive layer was formed by laminating "Mold Fit 50 (acrylic adhesive)" (manufactured by NICHIEI KAKOH CO., LTD.) on the surface of the substrate made of a resin where the hydrophilic resin layer was not formed.

The obtained hydrophilic laminate was evaluated in the same manner as in Example 1. The results are shown in Tables 2 and 3.

<Molding>

TOM molding (overlay molding) was carried out, and the pure water contact angle, the antifogging property, and the Martens hardness of the hydrophilic resin layer after the molding were evaluated by the above-described evaluation methods. Moreover, the appearance of the molded product was observed, and whether a scratch, a crack, or peeling was present or not was evaluated.

In addition, the heating (infrared heating) temperature in the heating process of heating the hydrophilic laminate was set to 150° C., and a 8 curve lens made of a polycarbonate was used as a molding material and the hydrophilic laminate was attached to the concave portion of the lens. In the overlay molding, the elongation percentage at the most elongated part of the hydrophilic laminate was 75%. The pure water contact angle and the antifogging property were evaluated at the part where the hydrophilic laminate was elongated by 75%. The results are shown in Table 3.

Example 11

A hydrophilic laminate was prepared in the same manner as in Example 10 except that the etching time in preparing the glass roll matrix in Example 10 was changed. The prepared hydrophilic laminate was evaluated in the same manner as in Example 10. The results are shown in Tables 2 and 3.

Example 12

A hydrophilic laminate was prepared in the same manner as in Example 10 except that the formulations of the ultraviolet curable resin composition for an anchor layer and the ultraviolet curable resin composition for a hydrophilic resin layer were changed to the following formulations. The prepared hydrophilic laminate was evaluated in the same manner as in Example 10. The results are shown in Tables 2 and 3.

| Ultraviolet Curable Resin Composition for Anchor Layer | |
|---|---|
| 8BR-500 (Urethane acrylate polymer, manufactured by TAISEI FINE CHEMICAL CO,. LTD.) | 45 parts by mass |
| UV-7550 (urethane acrylate, manufactured by The Nippon Synthetic Chemical Industry Co., Ltd.) | 15 parts by mass |
| Butyl acetate | 38.8 parts by mass |
| IRGACURE 184 (Ciba Specialty Chemicals Inc.) | 0.6 parts by mass |
| IRGACURE 907 (Ciba Specialty Chemicals Inc.) | 0.6 parts by mass |
| KP323 (Shin-Etsu Chemical Co., Ltd.) | 0.003 parts by mass |

| Ultraviolet Curable Resin Composition for Hydrophilic Resin Layer | |
|---|---|
| A-600 (Polyethylene glycol diacrylate, manufactured by SHIN-NAKAMURA CHEMICAL CO., LTD.) | 48 parts by mass |
| M-215 (isocyanuric acid diacrylate, manufactured by TOAGOSEI CO., LTD.) | 28 parts by mass |
| LIGHT ESTER THF (1000) (THF modified methacrylate, manufactured by KYOEISHA CHEMICAL Co., LTD.) | 20 parts by mass |
| Lucirin TPO (manufactured by BASF) | 4 parts by mass |

Example 13

A hydrophilic laminate was prepared in the same manner as in Example 12 except that the etching time in preparing the glass roll matrix in Example 12 was changed. The prepared hydrophilic laminate was evaluated in the same manner as in Example 10. The results are shown in Tables 2 and 3.

Example 14

A hydrophilic laminate was prepared in the same manner as in Example 10 except that the formulation of the ultraviolet curable resin composition for a hydrophilic resin layer was changed to the following formulation. The prepared hydrophilic laminate was evaluated in the same manner as in Example 10. The results are shown in Tables 2 and 3.

| Ultraviolet Curable Resin Composition for Hydrophilic Resin Layer | |
|---|---|
| A-600 (Polyethylene glycol diacrylate, manufactured by SHIN-NAKAMURA CHEMICAL CO., LTD.) | 33 parts by mass |
| M-215 (isocyanuric acid diacrylate, manufactured by TOAGOSEI CO., LTD.) | 43 parts by mass |

-continued

| Ultraviolet Curable Resin Composition for Hydrophilic Resin Layer | |
|---|---|
| LIGHT ESTER THF (1000) (THF modified methacrylate, manufactured by KYOEISHA CHEMICAL Co., LTD.) | 20 parts by mass |
| Lucirin TPO (manufactured by BASF) | 4 parts by mass |

Example 15

A hydrophilic laminate was prepared in the same manner as in Example 10 except that the formulation of the ultraviolet curable resin composition for a hydrophilic resin layer was changed to the following formulation. The prepared hydrophilic laminate was evaluated in the same manner as in Example 10. The results are shown in Tables 2 and 3.

| Ultraviolet Curable Resin Composition for Hydrophilic Resin Layer | |
|---|---|
| A-600 (Polyethylene glycol diacrylate, manufactured by SHIN-NAKAMURA CHEMICAL CO., LTD.) | 23 parts by mass |
| M-215 (isocyanuric acid diacrylate, manufactured by TOAGOSEI CO., LTD.) | 43 parts by mass |
| LIGHT ESTER THF (1000) (THF modified methacrylate, manufactured by KYOEISHA CHEMICAL Co., LTD.) | 30 parts by mass |
| Lucirin TPO (manufactured by BASF) | 4 parts by mass |

Comparative Example 1

A laminate was obtained in the same manner as in Example 1 except that the roll matrix was not brought into contact with the substrate made of a resin and having an anchor layer to which substrate the ultraviolet curable resin composition for a hydrophilic resin layer was applied in Example 1.

TABLE 2

| | | (Hydrophilic) Resin layer | | | | | |
|---|---|---|---|---|---|---|---|
| | Structure | Convex portions or concave portions | Pm (nm) | Hm (nm) | Hm/Pm | SRm | Average thickness (μm) |
| Example 1 | Closest packing | Convex portions | 270 | 100 | 0.37 | 1.42 | 1.6 |
| Example 2 | Closest packing | Convex portions | 270 | 160 | 0.59 | 1.84 | 1.6 |
| Example 3 | Closest packing | Concave portions | 270 | 150 | 0.56 | 1.74 | 1.6 |
| Example 4 | Closest packing | Convex portions | 270 | 230 | 0.85 | 2.02 | 1.6 |
| Example 5 | Closest packing | Concave portions | 270 | 230 | 0.85 | 2.03 | 1.6 |
| Example 6 | Stripe-shape | Concave portions | 150 | 63 | 0.42 | 1.55 | 1.6 |
| Example 7 | Stripe-shape | Concave portions | 100 | 48 | 0.48 | 1.48 | 1.6 |
| Example 8 | Mesh-shape | Concave portions | 50 | 39 | 0.78 | 1.72 | 1.6 |
| Example 9 | Mesh-shape | Concave portions | 80 | 60 | 0.75 | 2.01 | 1.6 |
| Example 10 | Closest packing | Convex portions | 270 | 100 | 0.37 | 1.42 | 1.6 |
| Example 11 | Closest packing | Convex portions | 270 | 230 | 0.85 | 2.02 | 1.6 |
| Example 12 | Closest packing | Convex portions | 270 | 100 | 0.37 | 1.42 | 1.6 |
| Example 13 | Closest packing | Convex portions | 270 | 230 | 0.85 | 2.02 | 1.6 |
| Example 14 | Closest packing | Convex portions | 270 | 100 | 0.37 | 1.42 | 1.6 |
| Example 15 | Closest packing | Convex portions | 270 | 100 | 0.37 | 1.42 | 1.6 |
| Comparative Example 1 | Flat surface | | | | | | 1.6 |

| | Pure water contact angle (°) | Martens hardness (N/mm²) | Pencil hardness | Elongation percentage (%) | Total light transmittance (%) | Haze (%) | Adhesiveness | Heat contraction percentage difference (%) |
|---|---|---|---|---|---|---|---|---|
| Example 1 | 20 | 88 | F | 50 | 92.5 | 0.2 | 100/100 | 0.5 |
| Example 2 | 10 | 88 | F | 50 | 94.3 | 0.2 | 100/100 | 0.5 |
| Example 3 | 10 | 88 | F | 50 | 94.2 | 0.2 | 100/100 | 0.5 |
| Example 4 | 8 | 88 | F | 50 | 95.1 | 0.2 | 100/100 | 0.5 |
| Example 5 | 8 | 88 | F | 50 | 95.0 | 0.2 | 100/100 | 0.5 |
| Example 6 | 15 | 88 | F | 50 | 93.4 | 1.1 | 100/100 | 0.5 |
| Example 7 | 18 | 88 | F | 50 | 93.6 | 0.9 | 100/100 | 0.5 |
| Example 8 | 20 | 88 | F | 50 | 92.9 | 0.6 | 100/100 | 0.5 |

TABLE 2-continued

| | | | | | | | | |
|---|---|---|---|---|---|---|---|---|
| Example 9 | 20 | 88 | F | 50 | 93.3 | 0.8 | 100/100 | 0.5 |
| Example 10 | 19 | 76 | H | 75 | 93.5 | 0.3 | 100/100 | 0.5 |
| Example 11 | 7 | 76 | H | 75 | 94.5 | 0.2 | 100/100 | 0.5 |
| Example 12 | 17 | 55 | H | 100 | 93.4 | 0.3 | 100/100 | 0.5 |
| Example 13 | 6 | 55 | H | 100 | 94.6 | 0.2 | 100/100 | 0.5 |
| Example 14 | 27 | 75 | H | 75 | 93.2 | 0.3 | 100/100 | 0.5 |
| Example 15 | 36 | 88 | H | 75 | 93.7 | 0.3 | 100/100 | 0.5 |
| Comparative Example 1 | 40 | 88 | F | 50 | 91.7 | 0.2 | 100/100 | 0.5 |

TABLE 3

| | Antifogging property | Scratch resistance | Interference unevenness |
|---|---|---|---|
| Example 1 | Good | Good | Good |
| Example 2 | Good | Good | Good |
| Example 3 | Good | Good | Good |
| Example 4 | Good | Good | Good |
| Example 5 | Good | Good | Good |
| Example 6 | Good | Good | Good |
| Example 7 | Good | Good | Good |
| Example 8 | Good | Good | Good |
| Example 9 | Good | Good | Good |
| Example 10 | Good | Good | Good |
| Example 11 | Good | Good | Good |
| Example 12 | Good | Good | Good |
| Example 13 | Good | Good | Good |
| Example 14 | Good | Good | Good |
| Example 15 | Good | Good | Good |
| Comparative Example 1 | Poor | Good | Good |

| | After molding | | | |
|---|---|---|---|---|
| | Pure water contact angle (°) | Antifogging property | Martens hardness (N/mm$^2$) | Appearance |
| Example 1 | 20 | Good | 90 | No scratch, no crack, and no peeling in hydrophilic resin layer |
| Example 2 | 13 | Good | 90 | No scratch, no crack, and no peeling in hydrophilic resin layer |
| Example 3 | 11 | Good | 90 | No scratch, no crack, and no peeling in hydrophilic resin layer |
| Example 4 | 11 | Good | 90 | No scratch, no crack, and no peeling in hydrophilic resin layer |
| Example 5 | 10 | Good | 90 | No scratch, no crack, and no peeling in hydrophilic resin layer |
| Example 6 | 16 | Good | 90 | No scratch, no crack, and no peeling in hydrophilic resin layer |
| Example 7 | 18 | Good | 90 | No scratch, no crack, and no peeling in hydrophilic resin layer |
| Example 8 | 20 | Good | 90 | No scratch, no crack, and no peeling in hydrophilic resin layer |
| Example 9 | 20 | Good | 90 | No scratch, no crack, and no peeling in hydrophilic resin layer |
| Example 10 | 19 | Good | 110 | No scratch, no crack, and no peeling in hydrophilic resin layer |
| Example 11 | 9 | Good | 110 | No scratch, no crack, and no peeling in hydrophilic resin layer |
| Example 12 | 18 | Good | 80 | No scratch, no crack, and no peeling in hydrophilic resin layer |

TABLE 3-continued

| Example 13 | 8 | Good | 80 | No scratch, no crack, and no peeling in hydrophilic resin layer |
| Example 14 | 29 | Good | 95 | No scratch, no crack, and no peeling in hydrophilic resin layer |
| Example 15 | 39 | Good | 100 | No scratch, no crack, and no peeling in hydrophilic resin layer |
| Comparative Example 1 | 41 | Poor | 90 | No scratch, no crack, and no peeling in hydrophilic resin layer |

Hydrophilic laminates of Examples 1 to 15 had a pure water contact angle of less than 40° and were excellent in antifogging property. Moreover, hydrophilic laminates of Examples 1 to 15 were also excellent in scratch resistance and interference unevenness. Furthermore, hydrophilic laminates of Examples 1 to 15 had a higher total light transmittance compared with the laminate of Comparative Example 1 not having micro convex portions or micro concave portions. This is due to the reflection preventing effect by convex portions or concave portions. In fact, when the hydrophilic laminate of Example 4, for example, was observed from an oblique direction under a white fluorescent light, blue diffraction light was confirmed slightly.

The hydrophilic laminates of Examples 1 to 15 had an elongation percentage of 10% or more and were also excellent in moldability. The hydrophilic resin layers before molding had a Martens hardness of 50 N/mm$^2$ or more and were also excellent in antifogging property and appearance after molding. When a surface of the hydrophilic resin layers after molding was observed by an AFM (AFM: Atomic Force Microscope), the mean pitch of the convex portions or the concave portions was not changed compared with the mean pitch of the convex portions or the concave portions before molding, the mean height of the convex portions or the mean depth of the concave portions became lower or shallower by about 10% compared with the mean height of the convex portions or the mean depth of the concave portions before molding, the mean aspect ratio became smaller by about 10% compared with the mean aspect ratio before molding, and the mean surface area ratio became smaller by about 5% compared with the mean surface area ratio before molding. The deformation of the micro convex portions or concave portions on the surface of the hydrophilic resin layers by molding was within the range that did not affect antifogging performance.

Moreover, the hydrophilic resin layers had the same Martens hardness before and after molding.

On the other hand, the laminate not having micro convex portions or micro concave portions of Comparative Example 1 had a pure water contact angle of 41° after the molding and had an insufficient antifogging property even though the resin composition of the same formulation was used for the outermost surface layer.

The hydrophilic laminate of the present invention can be used by attaching to glass windows, refrigerating/freezing show case, window materials for automobile windows, bath mirrors, mirrors such as side automobile mirrors, floors and walls of bath rooms, solar battery panels and security/surveillance cameras. Since the hydrophilic laminate of the present invention is easily molded and processed, the laminate can be used in a pair of glasses, goggles, head-gears, lenses, microlens arrays, and headlight covers, front panels, side panels and rear panels of automobiles by means of in-mold forming or insert molding.

What is claimed is:

1. A hydrophilic laminate, comprising:
    a substrate made of a resin; and
    a hydrophilic resin layer on the substrate made of a resin,
        wherein the hydrophilic resin layer comprises micro convex portions or micro concave portions in a surface thereof,
        wherein a pure water contact angle of the surface of the hydrophilic resin layer is less than 40°,
        wherein the hydrophilic laminate has an elongation percentage of 40% to 150%,
        wherein the hydrophilic resin layer contains a cured product of an active energy ray curable resin composition containing a methoxy polyethylene glycol mono (meth)acrylate and urethane (meth)acrylate,
        wherein the content of the methoxy polyethylene glycol mono(meth)acrylate in the active energy ray curable resin composition is 25 mass % to 50 mass %, and
        wherein the content of the urethane (meth)acrylate in the active energy ray curable resin composition is 10 mass % to 45 mass %.

2. The hydrophilic laminate according to claim 1, wherein a Martens hardness of the hydrophilic resin layer is 50 N/mm$^2$ to 300 N/mm$^2$.

3. The hydrophilic laminate according to claim 1, wherein the pencil hardness of the hydrophilic resin layer is B to 4H.

4. An antifouling laminate, comprising:
    a hydrophilic laminate,
    wherein the hydrophilic laminate comprises:
    a substrate made of a resin; and
    a hydrophilic resin layer on the substrate made of a resin,
        wherein the hydrophilic resin layer comprises micro convex portions or micro concave portions in a surface thereof,
        wherein a pure water contact angle of the surface of the hydrophilic resin layer is less than 40°,
        wherein the hydrophilic laminate has an elongation percentage of 40% to 150%,
        wherein the hydrophilic resin layer contains a cured product of an active energy ray curable resin composition containing a methoxy polyethylene glycol mono (meth)acrylate and urethane (meth)acrylate,
        wherein the content of the methoxy polyethylene glycol mono(meth)acrylate in the active energy ray curable resin composition is 25 mass % to 50 mass %, and
        wherein the content of the urethane (meth)acrylate in the active energy ray curable resin composition is 10 mass % to 45 mass %.

5. The antifouling laminate according to claim 4, wherein the pencil hardness of the hydrophilic resin layer is B to 4H.

6. A product, comprising:
a hydrophilic laminate on a surface thereof,
wherein the hydrophilic laminate comprises:
a substrate made of a resin; and
a hydrophilic resin layer on the substrate made of a resin,
wherein the hydrophilic resin layer comprises micro convex portions or micro concave portions in a surface thereof,
wherein a pure water contact angle of the surface of the hydrophilic resin layer is less than 40°,
wherein the hydrophilic laminate has an elongation percentage of 40% to 150%,
wherein the hydrophilic resin layer contains a cured product of an active energy ray curable resin composition containing a methoxy polyethylene glycol mono(meth)acrylate and urethane (meth)acrylate,
wherein the content of the methoxy polyethylene glycol mono(meth)acrylate in the active energy ray curable resin composition is 25 mass % to 50 mass %, and
wherein the content of the urethane (meth)acrylate in the active energy ray curable resin composition is 10 mass % to 45 mass %.

7. The product according to claim 6, wherein the pencil hardness of the hydrophilic resin layer is B to 4H.

* * * * *